(12) United States Patent
Umemoto

(10) Patent No.: US 11,356,243 B2
(45) Date of Patent: Jun. 7, 2022

(54) INFORMATION MANAGEMENT SYSTEM WITH BLOCKCHAIN AUTHENTICATION

(71) Applicant: Mallservice Inc., Osaka (JP)

(72) Inventor: Yasuhiro Umemoto, Kyoto (JP)

(73) Assignee: Mallservice Inc., Osaka (JP)

( * ) Notice: Subject to any disclaimer, the term of this patent is extended or adjusted under 35 U.S.C. 154(b) by 0 days.

(21) Appl. No.: 16/622,155

(22) PCT Filed: Jul. 5, 2019

(86) PCT No.: PCT/JP2019/026883
§ 371 (c)(1),
(2) Date: Dec. 12, 2019

(87) PCT Pub. No.: WO2020/225929
PCT Pub. Date: Nov. 12, 2020

(65) Prior Publication Data
US 2020/0382276 A1 Dec. 3, 2020

(30) Foreign Application Priority Data
May 8, 2019 (JP) .............................. JP2019-088029

(51) Int. Cl.
*H04L 29/06* (2006.01)
*H04L 9/06* (2006.01)
(Continued)

(52) U.S. Cl.
CPC .......... *H04L 9/0637* (2013.01); *H04L 9/3231* (2013.01); *H04L 9/3247* (2013.01);
(Continued)

(58) Field of Classification Search
CPC ... H04L 9/0637; H04L 9/3247; H04L 9/3231; H04L 2209/80; H04L 2209/38;
(Continued)

(56) References Cited

U.S. PATENT DOCUMENTS

2017/0237554 A1* 8/2017 Jacobs ................. H04L 9/3255
713/171
2017/0279801 A1 9/2017 Andrade
(Continued)

FOREIGN PATENT DOCUMENTS

JP 2018-014622 1/2018
JP 2019-057271 4/2019
(Continued)

OTHER PUBLICATIONS

Christidis et al., Blockchains and Smart Contracts for the Internet of Things; May 10, 2016; IEEE Access, p. 2292-2303 (Year: 2016).*

(Continued)

*Primary Examiner* — Taghi T Arani
*Assistant Examiner* — Lin Chang
(74) *Attorney, Agent, or Firm* — Hamre, Schumann, Mueller & Larson, P.C.

(57) ABSTRACT

Object to be solved is to achieve novel information management.
In order to solve the above circumstances, the present invention provides an information management system including: a blockchain stored in first and second nodes, in which the first or second node includes an authenticating means that executes an authentication process on a basis of feature data, the first node includes a first signing means that generates a first transaction signature and adds the first transaction signature to an unfinalized block in the blockchain, the second node includes a second signing means that generates a second transaction signature and adds the second transaction signature to the unfinalized block on a basis of a result of the authentication process and the first transaction signature, and the first node includes a chain updating means that hashes the unfinalized block and generates a block on a (Continued)

basis of the second transaction signature. According to the present invention, management of transaction on a network can be secured on the basis of individual authentication.

14 Claims, 15 Drawing Sheets

(51) Int. Cl.
  *H04L 9/32* (2006.01)
  *H04W 4/80* (2018.01)
(52) U.S. Cl.
  CPC ........... *H04W 4/80* (2018.02); *H04L 2209/38* (2013.01); *H04L 2209/80* (2013.01)
(58) Field of Classification Search
  CPC . H04L 67/306; H04L 63/0861; H04L 9/3297; H04L 9/3239; H04W 4/80
  See application file for complete search history.

(56) References Cited

U.S. PATENT DOCUMENTS

| | | | | |
|---|---|---|---|---|
| 2018/0101842 A1* | 4/2018 | Ventura | ................. | G06F 3/0619 |
| 2018/0285839 A1* | 10/2018 | Yang | ..................... | H04L 9/3239 |
| 2019/0036702 A1* | 1/2019 | Kano | .................... | G06F 16/182 |
| 2019/0057382 A1* | 2/2019 | Wright | .................. | H04L 9/0836 |
| 2019/0182257 A1* | 6/2019 | Lee | .................. | G06Q 10/06315 |
| 2019/0238344 A1* | 8/2019 | Kaga | ..................... | H04L 9/0891 |
| 2019/0340269 A1* | 11/2019 | Biernat | ................... | G06F 16/27 |
| 2019/0347653 A1* | 11/2019 | Lu | ............................ | H04L 9/30 |
| 2019/0378127 A1* | 12/2019 | Dudar | .................. | H04L 9/3239 |
| 2020/0050613 A1* | 2/2020 | Gauvreau, Jr. | ....... | H04L 9/0637 |
| 2020/0134206 A1* | 4/2020 | Thekadath | ............ | H04L 9/3247 |
| 2020/0169425 A1* | 5/2020 | Hofstee | ................. | H04L 63/108 |
| 2020/0177393 A1* | 6/2020 | Lopez | .................. | H04L 9/3236 |
| 2020/0320405 A1* | 10/2020 | Himeno | .................. | G06F 16/27 |
| 2020/0394651 A1* | 12/2020 | Kreder, III | ............. | G06Q 20/22 |

FOREIGN PATENT DOCUMENTS

| | | |
|---|---|---|
| JP | 6494004 B | 4/2019 |
| WO | 2017/175338 | 10/2017 |

OTHER PUBLICATIONS

Dorri et al. "Blockchain in Internet of Things: Challenges and Solutions", Aug. 18, 2016 (Year: 2016).*

International Search Report issued in International Application No. PCT/JP2019/026883, dated Aug. 27, 2019, 7 pages.

* cited by examiner

INFORMATION MANAGEMENT SYSTEM WITH BLOCKCHAIN AUTHENTICATION

TECHNICAL FIELD

The present invention relates to an information management system, an information management method, and an information management program product.

BACKGROUND ART

Information management including the management of transactions between electronic devices preferably achieves both security and privacy protection. In recent years, secure information management based on biometric authentication such as facial recognition or the like has been achieved, but the lack of perspective regarding privacy protection related to the handling of personal information for biometric authentication is being seen as problematic.

Also, in recent years, blockchain technology has been receiving attention as a solution for improving resistance to falsification in information management systems, and its usage is being extended into scenarios not limited to the exchange of tokens having economic value.

One of the prime advantages of blockchain technology is that liberalized information management not dependent on a centralized server may be achieved. For this reason, by introducing blockchain technology, privacy protection of biometric authentication in information management may be achieved favorably.

Patent Literature 1 discloses a method for constructing an authentication address in a blockchain, and includes at least a step of associating an identifier with an individual having an authenticated individual identity, a step of assigning an authentication address in the blockchain to the individual, and a step of recording the identifier and biometric feature data associated with the individual at the corresponding authentication address.

According to the invention described in Patent Literature 1, the biometric feature data is merely used for information management in the blockchain, and the blockchain and biometric authentication can hardly be said to be organically combined for protecting privacy in management of transaction.

CITATION LIST

Patent Literature

Patent Literature 1: JP 2019-57271 A

SUMMARY OF INVENTION

Technical Problem

The present invention has been devised in light of circumstances like the above, and an object thereof is to achieve novel information management.

Solution to Problem

In order to solve the above circumstances, the present invention provides an information management system including: a blockchain stored in first and second nodes, in which the first or second node includes an authenticating means that executes an authentication process on a basis of feature data, the first node includes a first signing means that generates a first transaction signature and adds the first transaction signature to an unfinalized block in the blockchain, the second node includes a second signing means that generates a second transaction signature and adds the second transaction signature to the unfinalized block on a basis of a result of the authentication process and the first transaction signature, and the first node includes a chain updating means that hashes the unfinalized block and generates a block on a basis of the second transaction signature. According to the present invention, management of transaction on a network can be secured on the basis of individual authentication.

In a preferable embodiment of the present invention, the blockchain supports a user-defined schema written on a basis of an object-oriented language, the user-defined schema includes a user-defined script for a smart contract execution and a user-defined profile that includes a result of the smart contract execution, and a hash value of the user-defined script is used to generate the first transaction signature. According to the present invention, a service deployed on a network can be designed flexibly. Also, according to the present invention, malicious changes in a user-defined script for a smart contract execution can be prevented from occurring.

In a preferable embodiment of the present invention, the blockchain is a private chain unique to each of at least one first node. According to the present invention, information saved on the network can be made resistant to falsification.

In a preferable embodiment of the present invention, the blockchain includes an unfinalized block that contains at least the first transaction signature and a hash value of a finalized block, and the finalized block contains the first and second transaction signatures and a hash value. According to the present invention, information saved on the network can be made resistant to falsification.

In a preferable embodiment of the present invention, the authenticating means executes the authentication process on a basis of the feature data newly acquired by the first node during the authentication process. According to the present invention, management of blockchain on an onsite network can be achieved.

In a preferable embodiment of the present invention, the authenticating means executes the authentication process on a basis of the feature data newly acquired by the second node during the authentication process. According to the present invention, management of blockchain on an onsite network can be achieved.

In a preferable embodiment of the present invention, the feature data is based on biometric data including face data. According to the present invention, individual authentication on a network can be secured.

In a preferable embodiment of the present invention, the first signing means generates and adds the first transaction signature when triggered by the hashing and block generation by the chain updating means. According to the present invention, management of blockchain on a network can be user-driven.

In a preferable embodiment of the present invention, the first node further includes a registering means that transmits a terminal signature corresponding to the first node and the feature data to the second node, the second node further includes a registration accepting means that accepts the feature data on a basis of the terminal signature and transmits a feature signature based on the feature data to the first node, and the authenticating means executes the authentication process in a case where the first node has the feature signature. According to the present invention, individual authentication on a network can be secured.

In a preferable embodiment of the present invention, the second node includes a transaction requesting means that issues a transaction request to the first node on a basis of the first transaction signature, and the first node further includes a transaction executing means that executes a transaction process on a basis of a result of the authentication process and the transaction request. According to the present invention, management of transaction on a network can be secured.

In a preferable embodiment of the present invention, the authenticating means executes the authentication process on a basis of the feature data acquired by the first or second node when triggered by the transaction request by the transaction requesting means, and the second signing means generates and adds the second transaction signature when triggered by the execution of the transaction process by the transaction executing means. According to the present invention, management of transaction on a network can be secured.

In a preferable embodiment of the present invention, the first node further includes a chain specifying means that searches for and specifies at least one blockchain corresponding to the first node. According to the present invention, management of blockchain on an onsite network can be achieved.

In a preferable embodiment of the present invention, at least one of the authenticating means, the first signing means, the second signing means, and the chain updating means is based on the first and second nodes for which an interconnection by short-range wireless communication is maintained. According to the present invention, management of blockchain on an onsite network can be achieved.

In a preferable embodiment of the present invention, the blockchain is a sidechain stored in a block in a main-chain. According to the present invention, a falsification-resistant consortium or public network can be used as a foundation for achieving management of transaction on a private network.

In a preferable embodiment of the present invention, the block in the main-chain contains the feature data. According to the present invention, in a falsification-resistant consortium or public network, feature data for individual authentication can be managed securely.

In order to solve the above circumstances, the present invention provides an information management method executed by a computer processor included in a first node, the information management method including: an authenticating step of executing an authentication process on a basis of feature data; a signing step of generating a first transaction signature and adding the first transaction signature to an unfinalized block in a blockchain stored in a second node and the first node; and a chain updating step of hashing the unfinalized block and generating a block on a basis of a second transaction signature generated by the second node.

In order to solve the above circumstances, the present invention provides an information management method executed by a computer processor included in a second node, the information management method including: an authenticating step of executing an authentication process on a basis of feature data; and a signing step of generating a second transaction signature and adding the second transaction signature to an unfinalized block in a blockchain stored in a first node and the second node, on a basis of a result of the authentication process and a first transaction signature generated by the first node.

In order to solve the above circumstances, the present invention provides an information management program causing a first node to function as: an authenticating means that executes an authentication process on a basis of feature data; a signing means that generates a first transaction signature and adds the first transaction signature to an unfinalized block in a blockchain stored in a second node and the first node; and a chain updating means that hashes the unfinalized block and generates a block on a basis of a second transaction signature generated on a basis of a private key corresponding to the second node.

In order to solve the above circumstances, the present invention provides an information management program causing a second node to function as: an authenticating means that executes an authentication process on a basis of feature data; and a signing means that generates a second transaction signature and adds the second transaction signature to an unfinalized block in a blockchain stored in a first node and the second node, on a basis of a first transaction signature generated on a basis of a private key corresponding to the first node and a result of the authentication process.

Advantageous Effects of Invention

According to the present invention, management of transaction on a network can be secured on the basis of individual authentication. Also, because the present invention uses a private chain in which finalization based on individual authentication is performed, additional technical advantages can be exhibited. Namely, management of transaction that is fast and lightweight compared to a public chain in which finalization based on consensus formation by an unspecified number of members can be achieved while excellent privacy protection is also established.

DESCRIPTION OF EMBODIMENTS

In an embodiment of the present invention, the configuration, operations, or the like of an information management system is described, but similar effects are also exhibited by a similarly-configured method, program, recording medium, or the like. For example, each means in the information management system and each step in the information management method respectively exhibits similar functions. Note that the program may be stored in the recording medium. If the recording medium is used, the program can be installed in a computer device for example. Herein, the recording medium storing the program is a non-transitory recording medium such as an optical disc or flash memory, for example. Also, the program includes source code or binary, and is encrypted as appropriate.

Embodiment 1

Hereinafter, the information management system according to Embodiment 1 of the present invention will be described using the figures. Note that the embodiment illustrated below is one example of the present invention. The present invention is not limited to the following embodiment, and can adopt a variety of configurations. Additionally, there are no limitations on the type of business conditions or services to which the information management system according to an embodiment of the present invention is applied.

<Hardware Configuration>

Figure 1:
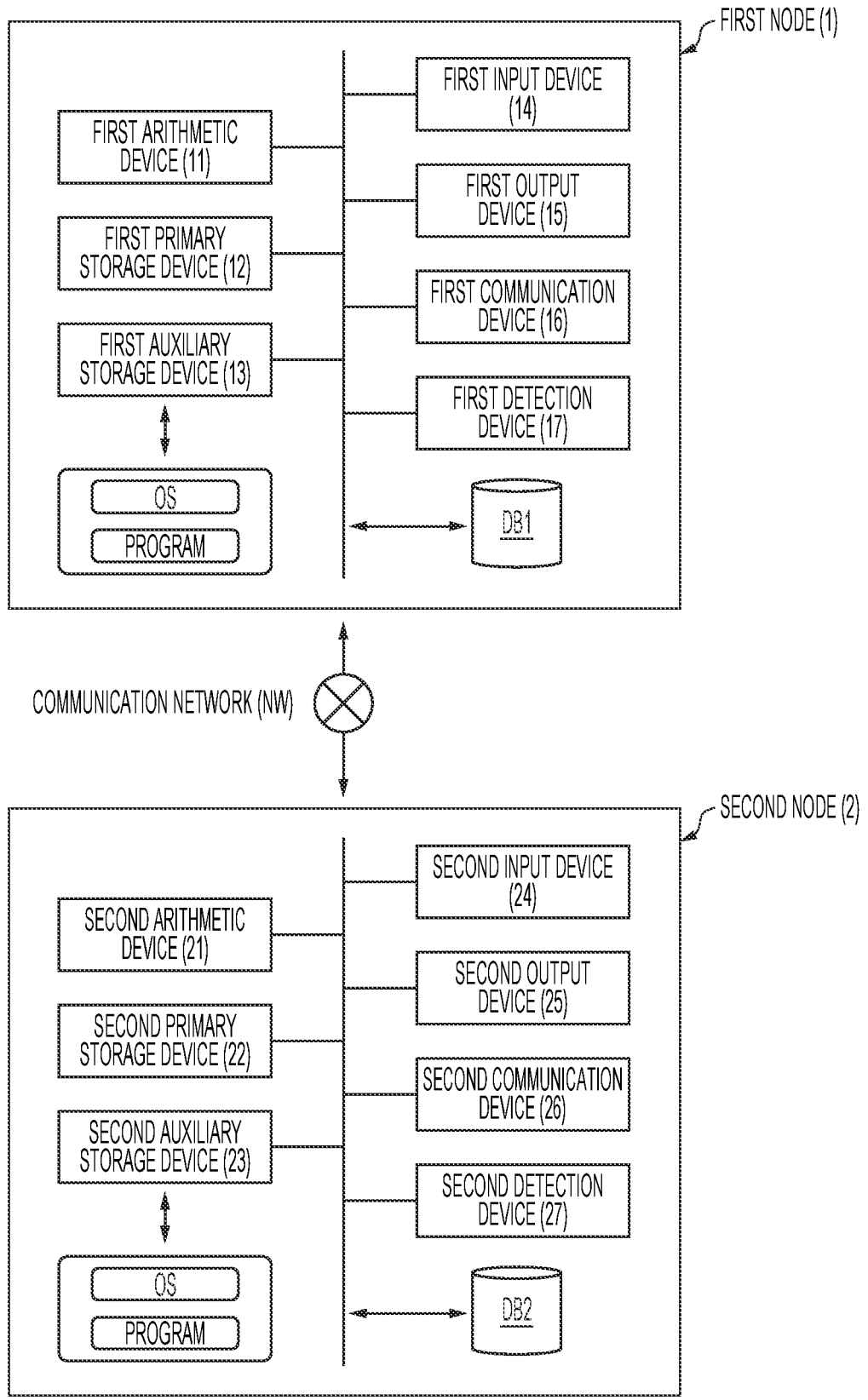
FIG. 1 is a hardware configuration diagram according to an embodiment of the present invention.

As illustrated in FIG. 1, the information management system includes a first node 1 and a second node 2. The first node 1 includes a first arithmetic device 11, a first primary storage device 12, a first auxiliary storage device 13, a first input device 14, a first output device 15, a first communication device 16, a first detection device 17, and a first bus interface for interconnection. The second node 2 includes a second arithmetic device 21, a second primary storage device 22, a second auxiliary storage device 23, a second input device 24, a second output device 25, a second communication device 26, a second detection device 27, and a second bus interface for interconnection. The first node 1 and the second node 2 can communicate with each other over a communication network NW. Hardware resources included in the information management system are used to achieve at least the functions included in the program.

The first arithmetic device 11 and the second arithmetic device 21 are provided with a processor core, of which a central processing unit (CPU) is one example.

The first primary storage device 12 and the second primary storage device 22 are provided with volatile memory, of which random access memory (RAM) is one example. The first auxiliary storage device 13 and the second auxiliary storage device 23 are provided with a non-volatile device such as a hard disk drive (HDD) or a solid-state drive (SSD).

The first auxiliary storage device 13 and the second auxiliary storage device 23 store data related to each of an operating system (OS) and the program. The first auxiliary storage device 13 and/or the second auxiliary storage device 23 may be provided with a primary storage area and one or more secondary storage areas. The first auxiliary storage device 13 and the second auxiliary storage device 23 correspond to a first database DB1 and a second database DB2, respectively.

The first node 1 and/or the second node 2 may be provided with a system-on-chip (SoC) integrating components such as the processor core and an application-specific integrated circuit (ASIC). The processors including the processor core may be programmable devices. The ASIC refers to a digital signal processor (DSP), such as a hardware encoder/decoder, or to a processor dedicated to machine learning (ML), for example. The first node 1 and/or the second node 2 may be provided with a memory device having a volatile cache area and a non-volatile data area.

The first input device 14 and the second input device 24 are used for an input process of inputting data related to the information management system. The first input device 14 and the second input device 24 include at least one of a keyboard, a touch panel, and a microphone. At this time, there are no limitations on the method of the input process.

The first output device 15 and the second output device 25 are used for a display process of the information management system. The first output device 15 and the second output device 25 include a visual display device such as display device or a projection device, of which a liquid crystal display (LCD) is one example, and a graphic controller, of which a graphics processing unit (GPU) is one example. The graphic controller may be included in the SoC. The first output device 15 and/or the second output device 25 may be a device that touches at least a part of the body, such as a head-mounted display for example.

The first communication device 16 and the second communication device 26 are preferably communication devices based on a short-range wireless communication method. The short-range wireless communication method is a communication method such as Bluetooth (registered trademark) or Zigbee (registered trademark) for example, and forms the communication network NW as a private network. At this time, the first communication device 16 and the second communication device 26 correspond to communicable distances D1 and D2, respectively. Note that the communication network NW according to Embodiment 1 may also be formed as a mesh network. The mesh network is achieved by treating other first nodes 1 or second nodes 2 as relay nodes for the communication network NW between the first node 1 and the second node 2.

The first detection device 17 and the second detection device 27 acquire detection data for deciding feature data 1004 described later. In the case where the feature data 1004 is face data, the first detection device 17 and the second detection device 27 are image sensors. Typical devices such as CMOS image sensors or infrared image sensors are adopted as the image sensors.

Note that the communication network NW can use a wired channel such as an optical line or a community antenna television (CATV) line, or a wireless channel such as a mobile telecommunications network, an aeronautical telecommunications network, or a satellite telecommunications network, and depending on the line, includes packet switches as appropriate.

The first node 1 and the second node 2 are configured as data terminal devices such as laptop computers, smartphones, and wearable devices. Each of the one or more first nodes 1 may cooperate with each of the other one or more first nodes 1, and thereby achieve the introduction of a program for any of the one or more first nodes 1.

Note that the first node 1 and/or the second node 2 according to an embodiment of the present invention may also be configured not to include an input device and/or an output device, like some Internet of Things (IoT) equipment, for example. In this case, the functions realized by the input device and/or the output device are substituted by a remote control or the like as appropriate.

<On-Site Network 0>

Figure 2:
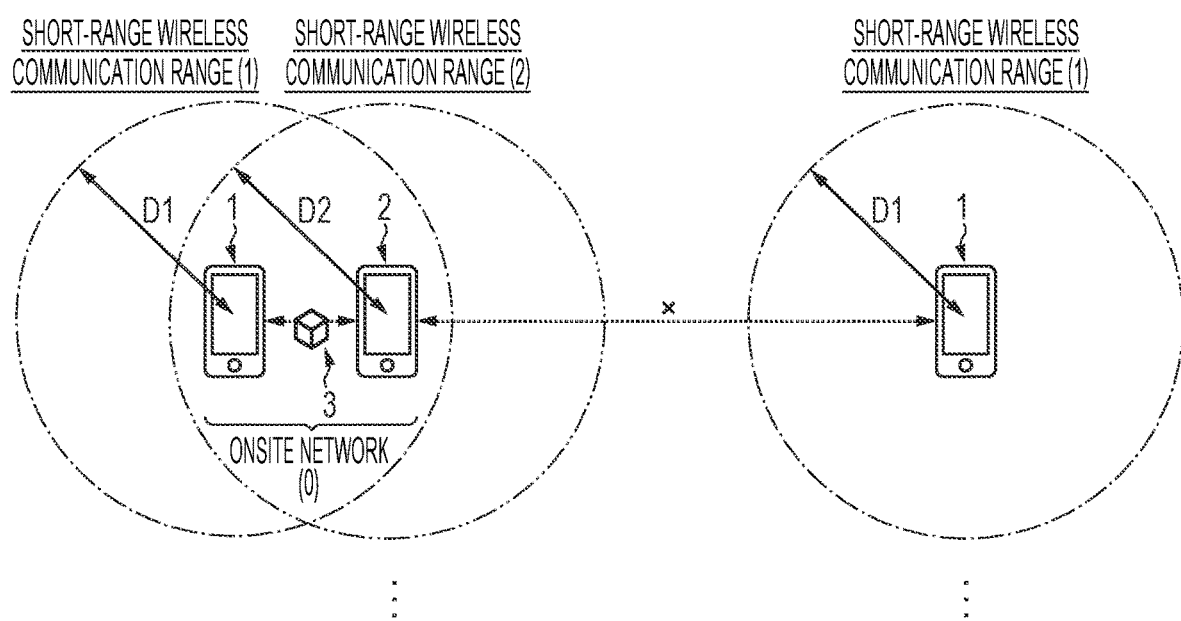
FIG. 2 is an overview of an onsite network including a blockchain according to an embodiment of the present invention.

As illustrated in FIG. 2, the information management system according to Embodiment 1 can be understood as an onsite network 0. The onsite network 0 includes the first node 1 and the second node 2 which maintain bidirectional communication (are paired) based on short-range wireless communication, and a blockchain 3. In this specification, "onsite" refers to being at a local such as inside an event venue for example, and refers to the private network itself that includes the first node 1 and the second node 2.

Figure 3:
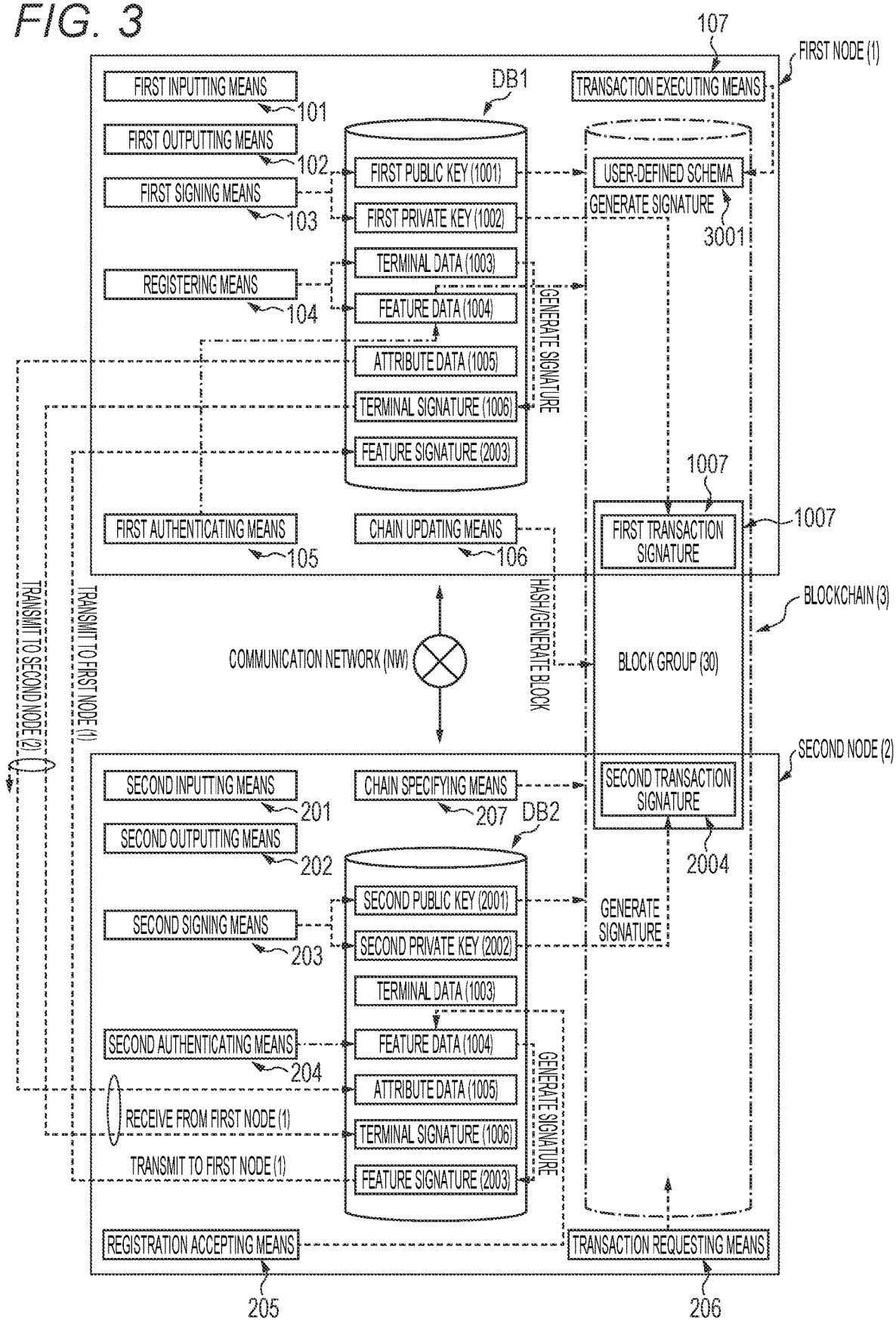
FIG. 3 is a function block diagram according to an embodiment of the present invention.

As illustrated in FIG. 3, the first node 1 and the second node 2 in the onsite network 0 include a first database DB1 and a second database DB2, respectively. Furthermore, the blockchain 3 including a block group 30 and a user-defined schema 3001 is stored in the first node 1 and the second node 2. At this time, information about the blockchain 3 can be understood by being saved in a distributed manner in the first database DB1 and the second database DB2, for example.

<First Node 1>

As illustrated in FIG. 3, the first node 1 includes at least the first database DB1, a first inputting means 101, a first outputting means 102, a first signing means 103, a registering means 104, a first authenticating means 105, a chain updating means 106, and a transaction executing means 107.

The first database DB1 includes a first public key 1001, a first private key 1002, terminal data 1003, feature data 1004, attribute data 1005, a terminal signature 1006, and a feature signature 2003. The first public key 1001 corresponds to the first private key 1002. The first database DB1 in Embodiment 1 is preferably configured as a key-value store (KVS).

The first inputting means 101 inputs information through the first node 1 in the information management system, on the basis of the first input device 14.

The first outputting means 102 executes a display process that includes a screen display on the first node 1 in the information management system, on the basis of the first output device 15. The screen display is a display process at least involving a transaction start screen W4, an authentication screen W5, and a transaction completion screen W6.

The first signing means 103 generates a first transaction signature 1007 on the basis of the first private key 1002, and stores the first transaction signature 1007 in an unfinalized block 33 in the blockchain 3 described later. Also, the first signing means 103 generates the terminal signature 1006 on the basis of the terminal data 1003 and the first private key 1002.

The first transaction signature 1007 is preferably generated on the additional basis of a hash value based on the user-defined schema 3001 described later, more preferably generated on the basis of a hash value of a user-defined profile described later, and more preferably generated on the basis of a hash value of a user-defined script described later.

The registering means 104 transmits the terminal data 1003, the feature data 1004, the attribute data 1005, and the terminal signature 1006 to the second node 2. The terminal data 1003 in Embodiment 1 is a terminal identifier corresponding to the first node 1, for example. Also, the attribute data 1005 in Embodiment 1 is personal information such as the user's birth date, gender, or the like. The feature data 1004 transmitted to the second node 2 by the registering means 104 may also be treated as a hash value.

The first authenticating means 105 executes an authentication process on the basis of the feature data 1004. The first authenticating means 105 executes the authentication process on the basis of feature data 1004 newly acquired by the first node 1 at the time of the authentication process, and also feature data 1004 previously stored in the first database DB1.

One aspect of the first authenticating means 105 determines a similarity on the basis of N-dimensional vector data indicating each of two different pieces of feature data 1004. In the case where the similarity satisfies a predetermined condition, the authentication process is successful. As an example, the similarity is determined on the basis of the Euclidean distance or the cosine similarity indicated by the N-dimensional vector data.

The dimensionality of the N-dimensional vector data corresponding to the feature data 1004 is preferably 4096 or higher, more preferably 2048 or higher, more preferably 1024 or higher, more preferably 512 or higher, more preferably 256 or higher, and more preferably 128 or higher.

The feature data 1004 in Embodiment 1 is determined through the feature extraction of detection data acquired by the first detection device 17. In one aspect of the first authenticating means 105, any feature extraction algorithm including a process of calculating an eigenvector with a principal component analysis (PCA) model, a learning and inference process using a deep learning model such as a convolutional neural network (CNN) model, a learning and classification process using a decision tree model such as a support vector machine (SVM), and an extraction process using a histogram of oriented gradients (HOG) is adopted. The configuration is not limited to the above algorithm, and a common algorithm may be adopted as appropriate.

The feature data 1004 in Embodiment 1 is preferably based on biometric data such as face data, fingerprint data, handprint data, retina data, voiceprint data, iris data, and vein pattern data, and is more preferably face data.

The hardware configuration of the first detection device 17 and the second detection device 27 may be changed appropriately according to the type of the biometric data.

Note that in Embodiment 1, it may also be configured such that a compound authentication process is performed by the first authenticating means 105 on the basis of the feature data 1004 corresponding to each of two or more different types of biometric data.

Note that the feature data 1004 in Embodiment 1 may also be based on data for handwriting authentication, gait authentication, or the like, and any type of information pattern emitted from an individual may be adopted as appropriate.

The chain updating means 106 acquires the hash value of the unfinalized block 33 in the blockchain 3 and treats the unfinalized block 33 as a finalized block 32, in addition, the chain updating means 106 generates a new unfinalized block 33 and stores the hash value in the new unfinalized block 33. At this time, the chain updating means 106 stores the first transaction signature 1007 in the new unfinalized block 33.

The one-way transformation for generating a hash value, a public key, or an electronic signature in Embodiment 1 is preferably configured to be performed by a cryptographic method such as the RSA method, the DSA method, or the Schnorr method. The hash value generation may be configured to be performed by a plurality of one-way transformations, and may also be configured to add a random number or metadata when performing the one-way transformation. Also, signature verification or the like is obviously performed in accordance with the above one-way transformation.

Note that the electronic signature in an embodiment of the present invention may be a Lamport signature.

The transaction executing means 107 executes a transaction process when triggered by a transaction request by a transaction requesting means 206 described later. At this time, the transaction process is executed on the basis of a user-defined script included in the user-defined schema 3001. Also, the transaction executing means 107 executes the transaction process on the basis of a transaction token described later. Information related to the transaction process in Embodiment 1 is handled as at least a portion of the user-defined schema 3001.

<Second Node 2>

As illustrated in FIG. 3, the second node 2 includes at least a second inputting means 201, a second outputting means 202, a second signing means 203, a second authenticating means 204, a registration accepting means 205, the transaction requesting means 206, and a chain specifying means 207.

The second database DB2 includes a second public key 2001, a second private key 2002, terminal data 1003, feature data 1004, attribute data 1005, a terminal signature 1006, and a feature signature 2003. The second public key 2001 corresponds to the second private key 2002. The second database DB2 in Embodiment 1 is preferably configured as a KVS, in a similar manner as the first database DB1. Additionally, the second database DB2 may also include at least one piece of snapshot data of the various information stored in the first database DB1.

The second inputting means 201 inputs information through the second node 2 in the information management system, on the basis of the second input device 24.

The second outputting means 202 executes a display process that includes a screen display on the second node 2 in the information management system, on the basis of the second output device 25. The screen display is a display process at least involving a chain specification screen W1.

The second signing means 203 generates a second transaction signature 2004 on the basis of the second private key 2002, and stores the second transaction signature 2004 in an unfinalized block 33 in the blockchain 3 described later. Also, the second signing means 203 generates the feature signature 2003 on the basis of the feature data 1004 and the second private key 2002.

The second transaction signature 2004 is preferably generated on the additional basis of a hash value based on the user-defined schema 3001, more preferably generated on the basis of the hash value of the user-defined profile, and more preferably generated on the basis of the hash value of the user-defined script.

The second authenticating means 204 executes an authentication process on the basis of the feature data 1004. The second authenticating means 204 executes the authentication process on the basis of feature data 1004 newly acquired by the second node 2 at the time of the authentication process, and also feature data 1004 previously stored in the second database DB2. Note that the functions included in the second authenticating means 204 are the same as the first authenticating means 105 unless specifically noted otherwise.

The registration accepting means 205 accepts the terminal data 1003, the feature data 1004, the attribute data 1005, and the terminal signature 1006 transmitted by the registering means 104, and stores the accepted data in the second database DB2. At this time, the registration accepting means 205 transmits the feature signature 2003 generated by the second signing means 203 to the first node 1.

The transaction requesting means 206 issues a transaction request corresponding to the transaction process to the first node 1. At this time, the transaction request is issued on the basis of the first transaction signature 1007 inside the unfinalized block 33 in the blockchain 3, details about which will be described later.

The chain specifying means 207 finds the first node 1 capable of intercommunication on the communication network NW and the blockchain 3 corresponding to the first node 1. Also, the chain specifying means 207 specifies at least one found blockchain 3 on the basis of intention input provided via a screen display. Details about the screen display will be described later.

The first authenticating means 105 and the second authenticating means 204 in this specification are referred to collectively as the authenticating means. Also, the first signing means 103 and the second signing means 203 are referred to collectively as the signing means.

<Blockchain 3 (Onsite Chain)>

Figure 4:
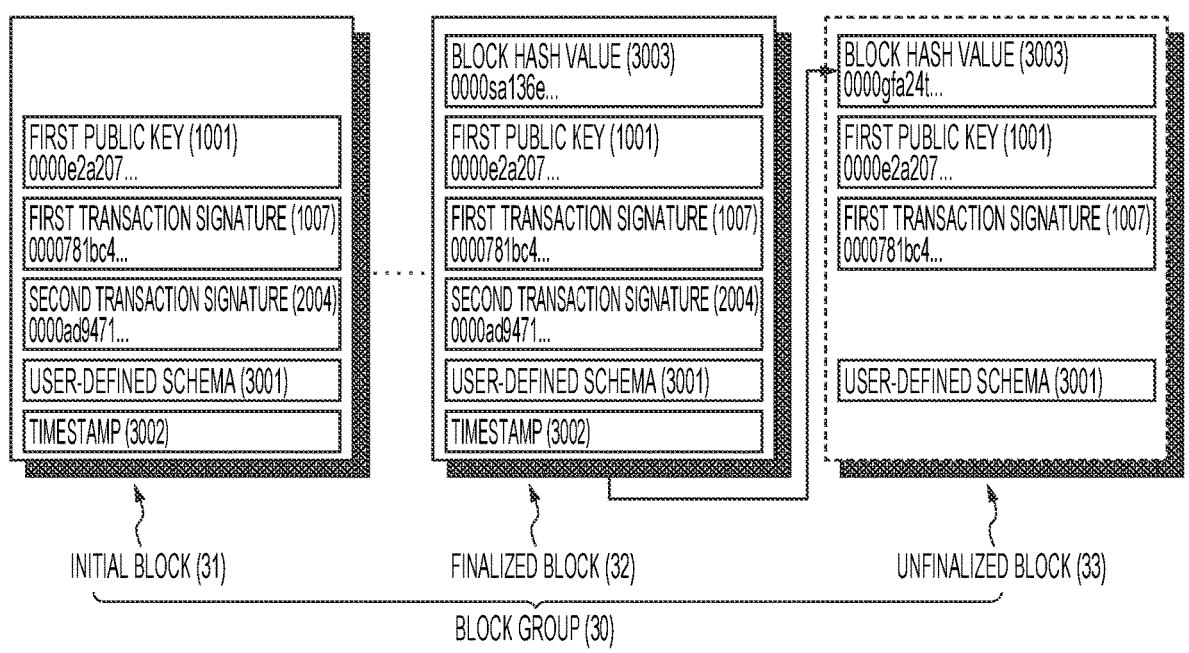
FIG. 4 is an explanatory diagram illustrating a data structure of a blockchain according to an embodiment of the present invention.

As illustrated in FIG. 4, the block group 30 in the blockchain 3 in Embodiment 1 includes an initial block 31, the finalized block 32, and the unfinalized block 33. The user-defined schema 3001 is associated with or stored in each block of the block group 30. Note that each block of the block group 30 in this specification is handled as a block header.

The blockchain 3 in Embodiment 1 is preferably configured as appropriate to have a transaction token for the transaction process, such as a settlement key. Note that the blockchain 3 in Embodiment 1 is managed on the onsite network 0, and therefore may be referred to as an onsite chain.

<Block Group 30>

The initial block 31 refers to a genesis block generated by the first node 1, and includes the first public key 1001, the first transaction signature 1007, a second transaction signature 2004, the user-defined schema 3001, and a timestamp 3002. The timestamp 3002 may correspond to the date and time of the generation of the initial block 31 or to the date and time of each signature.

The finalized block 32 refers to a block finalized by the first node 1, and includes the first public key 1001, the first transaction signature 1007, the second transaction signature 2004, the user-defined schema 3001, the timestamp 3002, and a block hash value 3003. The timestamp 3002 may correspond to the date and time of the generation of the finalized block 32 or to the date and time of generation of each signature. Note that the "block" in the block hash value 3003 refers to the immediately preceding block.

In this specification, "immediately preceding block" refers to the block immediately preceding in the generation order in the same blockchain 3. Also, the block hash value 3003 is a hash value obtained by hashing the immediately preceding block on the basis of a one-way function.

The unfinalized block 33 refers to a block that has not been finalized by the first node 1, and includes at least the block hash value 3003, the first public key 1001, the first transaction signature 1007, and the user-defined schema 3001.

It is sufficient for the blockchain 3 in Embodiment 1 to include at least one initial block 31 and one unfinalized block 33, and the blockchain 3 may be in a state that does not include the finalized block 32. Also, the blockchain 3 in Embodiment 1 may be in a state that includes one unfinalized block 33 that does not include the block hash value 3003. Also, the blockchain 3 in Embodiment 1 may take a state that includes only the initial block 31.

Figure 5:
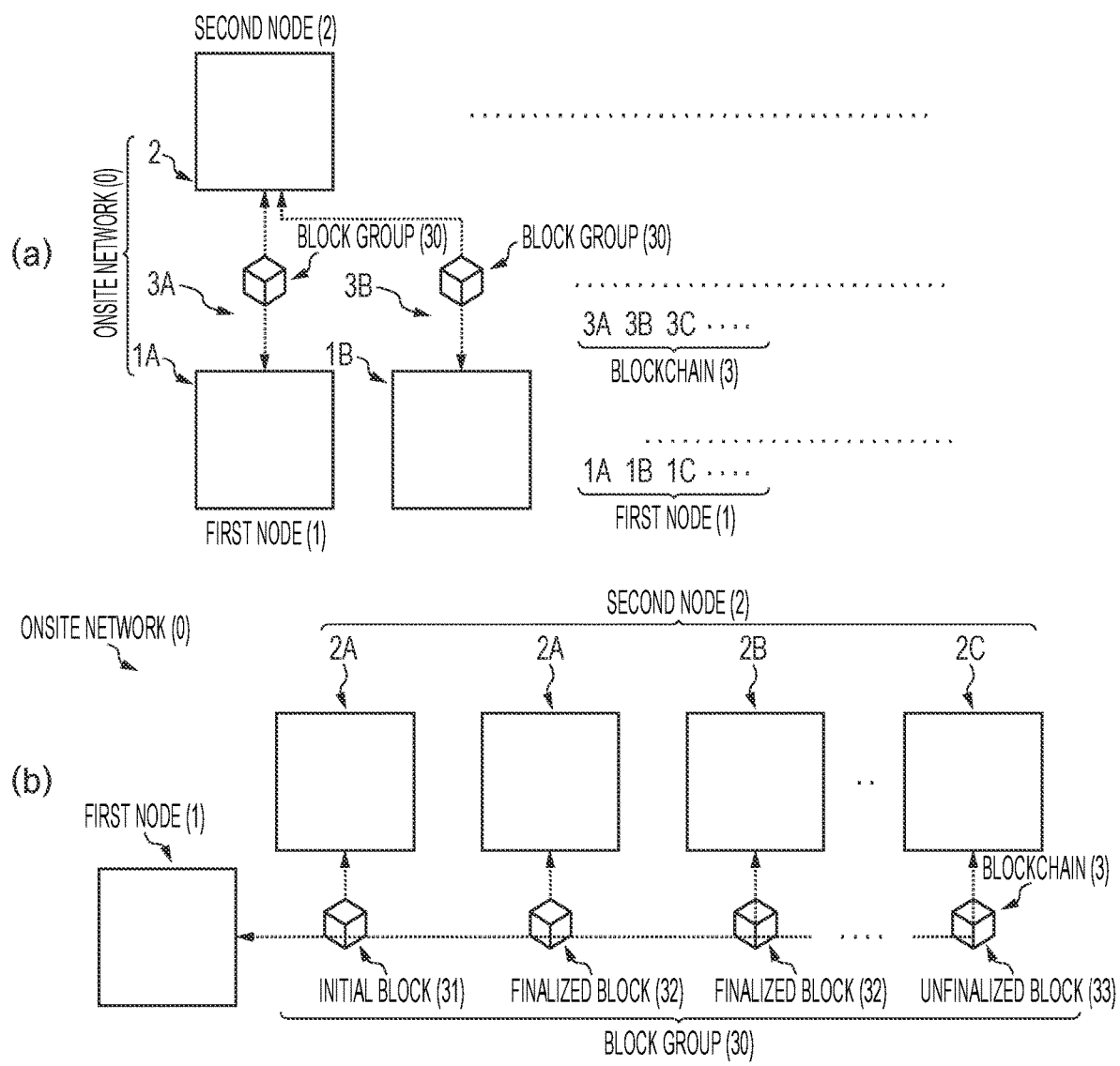
FIG. 5 is an overview of an onsite network including first and second nodes according to an embodiment of the present invention.

As illustrated in FIG. 5(*a*), the onsite network 0 includes unique first nodes 1 and second nodes 2. In this case, a first node 1A and a first node 1B correspond to a blockchain 3A and a blockchain 3B, respectively. Note that the number of blockchain 3 on the onsite network 0 is not particularly limited.

Note that "unique first node 1" in the description of this specification refers to a first node 1 that is unique to the onsite network 0.

As illustrated in FIG. 5(*b*), the onsite network 0 includes a unique first node 1 and one or more second nodes 2. In this case, each block included in the block group 30 in the blockchain 3 is not limited to corresponding to a single second node 2, and as illustrated in FIG. 5(*b*), may correspond to each of a second node 2A, a second node 2B, and a second node 2C. In this case, the second transaction signature 2004 in each block is obviously generated on the basis of the second private key 2002 of the second node 2 corresponding to each block. Note that the number of second nodes 2 corresponding to the single blockchain 3 is not particularly limited.

Although the onsite network 0 in Embodiment 1 is a private network that includes the first node 1, the second node 2, and the blockchain 3, the unique configuration lies in the first node 1 and the blockchain 3. In other words, the onsite network 0 in Embodiment 1 can be understood to be a flexible private network capable of changing the second node 2.

<User-Defined Schema 3001>

The user-defined schema 3001 in the blockchain 3 includes a user-defined profile and a user-defined script corresponding to the transaction process executed between the first node 1 and the second node 2.

Note that "user" in the description of this specification preferably refers to the owner/administrator of the first node 1, and more preferably refers to the owner/administrator of the first node 1 or the second node 2.

The user-defined schema 3001 in Embodiment 1 is written on the basis of an object-oriented language in JavaScript (registered trademark) Object Notation (JSON) format, for example. For this reason, the data types handled by the user-defined schema 3001 are at least character strings, numerical values, boolean values, or the like.

The user-defined schema 3001 in Embodiment 1 may be configured to be written in the state of information indicating the status of a processing performed between the first node 1 and the second node 2.

The user-defined schema 3001 in Embodiment 1 may also be configured to include the feature data 1004 or its hash value. In this case, the feature data 1004 may be utilized for the authentication process by the authenticating means. Also, even in the case of managing the feature data 1004 with the user-defined schema 3001, a configuration needing at least a portion of the processing by the registering means 104 and the registration accepting means 205 may be taken.

Hereinafter, one example of a user-defined profile in Embodiment 1 will be given. This example illustrates a user-defined profile for the case where the transaction process is a settlement process.

{
Type: Portable Payment,
Claimant: ABCDE,
Shop ID: 1234,
Coordinator: FGHIJ,
Invoice date: YYYY-MM-DD,
Invoice: 5000,
Breakdown: Stationery,
Settlement type: Immediate settlement (credit line),
Settlement result: OK-01000,
Credit line
{
Limit: 30,000,
Balance: 5,000,
Movement type: Payment (limit set, charge, transfer, receipt),
Movement date: YYYY-MM-DD HH:MM:SS,
}
Settlement date: YYYY-MM-DD HH:MM:SS,
Web login key: ABC . . . ,
Member ID: ABC . . . ,
Execution code: function{ },
First transaction signature 1007: BBBB . . . ,
Approval code: abc123,
First transaction signature 1007: XXXXXX,
Status: 1
}

The user-defined schema 3001 corresponding to the settlement process above is not limited to credit line data, and may also be configured such that credit card data is written. Also, data that is typical for performing a settlement process may be written in the user-defined schema 3001. Specifically, for example, information such as a cryptocurrency wallet address may be written.

Hereinafter, one example of a user-defined profile in Embodiment 1 will be given. This example illustrates a user-defined profile for the case where a qualification submission process is a transaction process.

{
Type: Portable Identification,
Qualification: Department Head
Department: Software Development Group
Name: ABC DEF,
Birth date: YYYY-MM-DD,
Qualification acquisition date: YYYY-MM-DD HH:MM:SS,
Organization name: XYZ1,
Organization ID: XXXX . . . ,
Certification date: YYYY-MM-DD HH:MM:SS,
Valid until: YYYY-MM-DD HH:MM:SS,
Certifier: XYZ2,
Web login key: ABC . . . ,
Execution code: function{ },
First transaction signature 1007: BBBB . . . ,
Status: 1

}

The user-defined profile corresponding to the qualification presentation process above may also be configured to support a user-defined script that acquires a public key for certifying an academic degree from an external URL.

Hereinafter, one example of a user-defined profile in Embodiment 1 will be given. This example illustrates a user-defined profile for the case where a lending and borrowing management process is a transaction process.

{
Type: CarRental,
Digital key: XXXX . . . ,
Departure point: Departure,
Departure point latitude and longitude: . . . ,
Departure time: YYYY-MM-DD HH:MM:SS,
Arrival point: Arrival,
Arrival point latitude and longitude: . . . ,
Arrival time: YYYY-MM-DD HH:MM:SS,
Rental start date: YYYY-MM-DD HH:MM:SS,
Rental end date: YYYY-MM-DD HH:MM:SS,
Web login key: ABC . . . ,
Execution code: function{ },
First transaction signature 1007: BBBB . . . ,
Status: 1
}

As an example, in the user-defined profile corresponding to the lending and borrowing management process above, a digital key of an automobile or the like that the lender, namely the owner of the first node 1, provides to borrower, namely the owner of the second node 2, is written. Information such as a check-in location and a term of validity are registered in the digital key, and borrower can use the automobile or the like within the scope of the agreement. Note that data related to latitude and longitude may be acquired by the first detection device 17 or the second detection device 27, or may be acquired on the basis of the communication network NW that includes a Wi-Fi network.

<User-Defined Script>

The user-defined script is code for executing the transaction process on the basis of the user-defined profile included in the user-defined schema 3001, and is written in a script language such as JavaScript (registered trademark).

The execution of the transaction process in Embodiment 1 is performed as a smart contract. Specifically, for example, the exercise of a transaction process including a settlement process is determined on the basis of a set amount of money indicated by the credit line data in the user-defined schema 3001.

The user-defined script is prohibited from accessing a website or the like not stored in the first database DB1 and the second database DB2. In this case, permission data including a list of URLs permitted to be accessed may be provided by the second node 2. Note that the user-defined script preferably operates in a sandbox environment on the first node 1 and/or the second node 2.

Obviously, the user-defined script is changed appropriately depending on the form of the transaction process. Herein, forms of the transaction process include a settlement process, an unlocking process, a qualification presentation process, and a lending and borrowing management process, for example. Also, the user-defined script according to Example 1 may be freely changed for each blockchain 3.

The user-defined script is changed by the first inputting means 101 or the second inputting means 201. In this case, the first node 1 or the second node 2 may be configured to manage the user-defined script editing privileges by adding an electronic signature to the user-defined script. Specifically, as one function of the user-defined script, a predetermined public key is associated as information for prohibiting modification, such that if an electronic signature corresponding to the public key cannot be added, modification of the user-defined script is not permitted. The electronic signature may be generated on the basis of various information on the onsite network 0, including information in the first database DB1 or the second database DB2.

Note that each of the various types of data described in this specification may also refer to a hash value based on each of the various types of data in some cases.

<Process Flowchart/Sequence>

Hereinafter, a process flowchart according to the information management system of Embodiment 1 will be described. The process flowchart is a set of one or more steps, and each step is achieved on the basis of at least a portion of the functions of each means. Also, in this specification, the steps in the process flowchart are given in no particular order unless specifically indicated otherwise.

Also, because the onsite network 0 in Embodiment 1 of the present invention is for management of transaction based on the blockchain 3, the steps are repeated cyclically.

Figure 6:
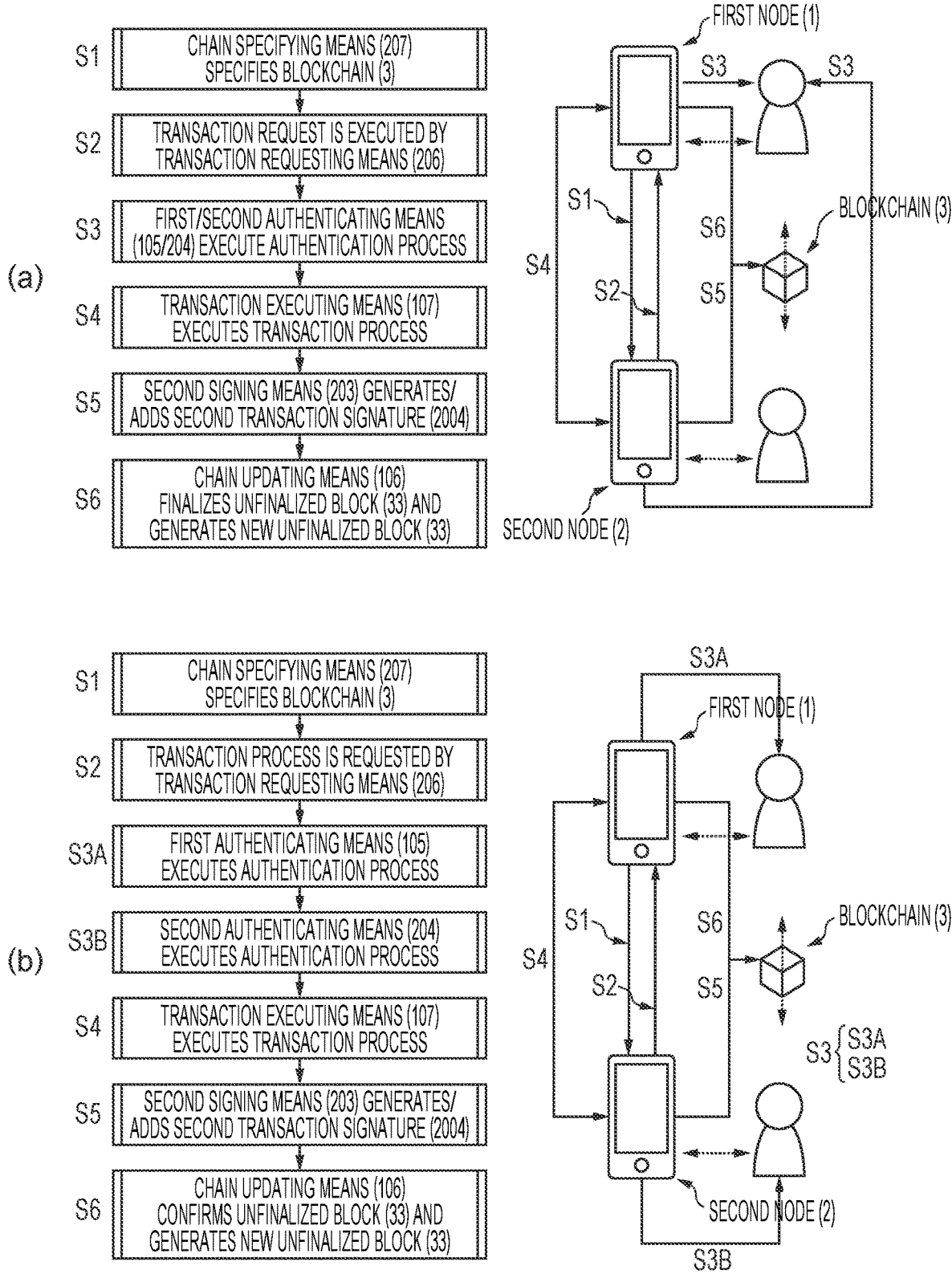
FIG. 6 is a process flowchart according to an embodiment of the present invention, in which (a) is a case where an authentication process is performed by a first or a second node, and (b) is a case in which the authentication process is performed by a first and a second node.

As illustrated in FIG. 6(*a*), at least a portion of the series of processes according to the information management system includes a chain specifying step S1 in which the chain specifying means 207 specifies the blockchain 3, a transaction requesting step S2 in which a transaction request is executed by the transaction requesting means 206, an authenticating step S3 in which the first authenticating means 105 or the second authenticating means 204 executes the authentication process, a transaction executing step S4 in which the transaction executing means 107 executes the transaction process, a second signing step S5 in which the second signing means 203 generates and adds the second transaction signature 2004 to the blockchain 3, and a chain updating step S6 in which the chain updating means 106 finalizes the unfinalized block 33 and generates a new unfinalized block 33.

As illustrated in FIG. 6(*b*), in the series of processes according to the information management system, the authenticating step S3 may also be configured to include a first authenticating step S3A that includes the authentication process by the first authenticating means 105 and a second authenticating step S3B that includes the authentication process by the second authenticating means 204. Note that the source from which the feature data 1004 is collected in the authenticating step S3 may be a user corresponding to the first node 1 or a user corresponding to the second node 2.

The chain updating step S6 in Embodiment 1 is preferably performed concurrently with or after the second signing step S5. Also, the second signing step S5 in Embodiment 1 is performed concurrently with or after the transaction executing step S4. Also, the transaction executing step S4 in Embodiment 1 is preferably performed concurrently with or after the transaction requesting step S2. Also, the transaction requesting step S2 in Embodiment 1 is performed concurrently with or after the chain specifying step S1.

Hereinafter, details about the series of processes according to the information management system will be described using FIGS. 8 to 11. Note that a registering step S0 in Embodiment 1 is preferably performed concurrently with or before the chain specifying step S1.

<Registering Step S0>

Figure 7:
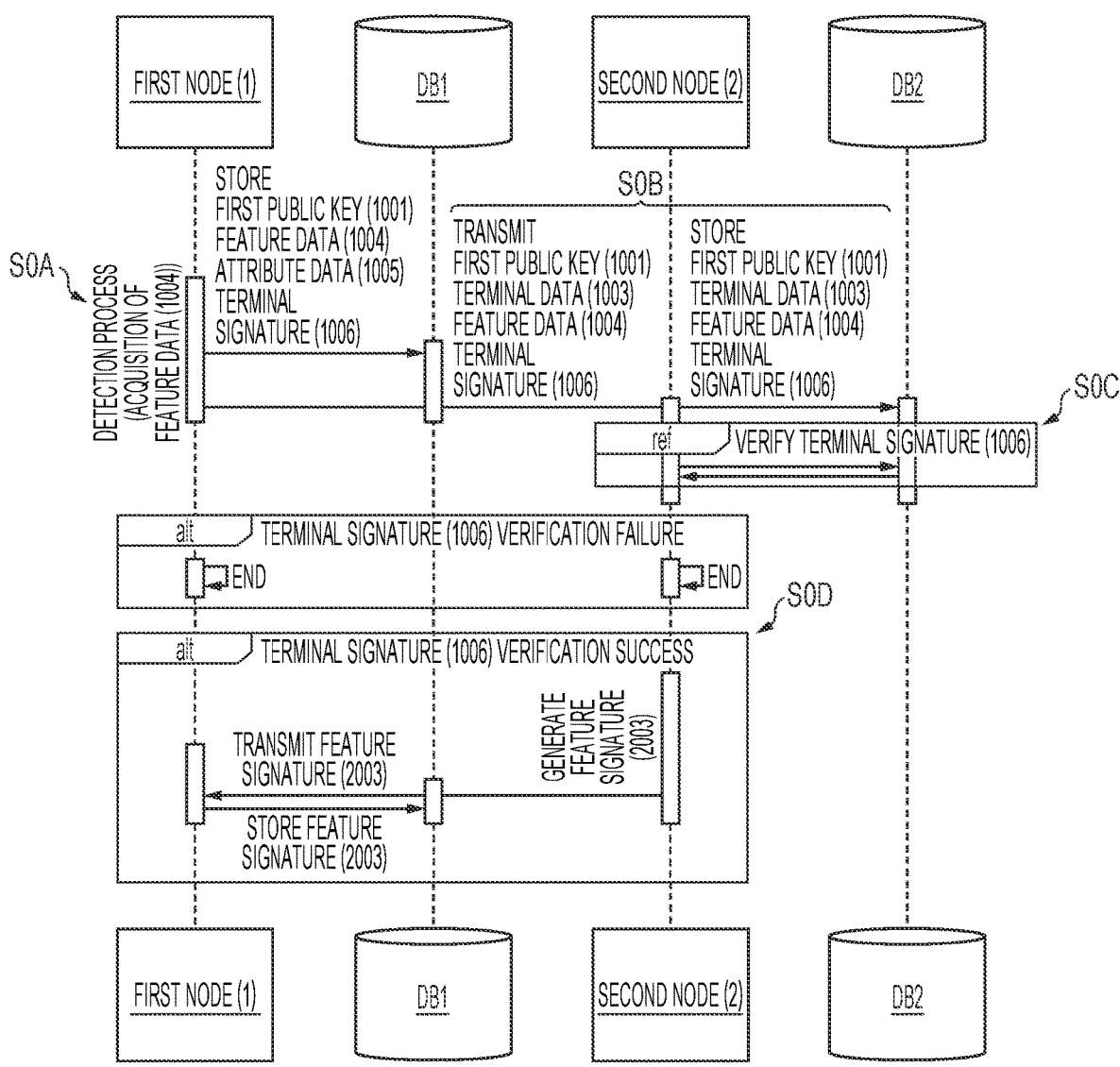
FIG. 7 is a sequence diagram of a process that includes a registration step according to an embodiment of the present invention.

As illustrated in FIG. 7, in the registering step S0, the feature data 1004 is registered. First, the first node 1 acquires detection data (detection process) and determines the feature data 1004 (registering step S0A). At this time, the first public key 1001, the feature data 1004, the attribute data 1005, and the terminal signature 1006 are stored in the first database DB1. Next, the first public key 1001, the feature data 1004, the attribute data 1005, and the terminal signature 1006 are transmitted to the second node 2 and stored in the second database DB2 (registering step S0B). Next, the terminal signature 1006 is verified on the basis of the first public key 1001 (registering step S0C). In the case where the verification of the terminal signature 1006 fails, the process according to the registering step S0 is ended. In the case where the verification of the terminal signature 1006 is successful, the feature signature 2003 is generated on the basis of the feature data 1004 and transmitted to the first node 1 by the second node 2 (registering step S0D).

A failed signature verification in this specification refers to a mismatch between signed information and information obtained by decrypting an electronic signature based on a public key. Also, a successful signature verification refers to a match between the signed information and the information obtained by decryption.

The registering step S0 in Embodiment 1 is preferably performed prior to the generation of the initial block 31 in the blockchain 3.

Note that after the initial block 31 is generated, the registering step S0 obviously may be performed again for the purpose of changing or updating the feature data 1004.

<Chain Specifying Step S1>

Figure 8:
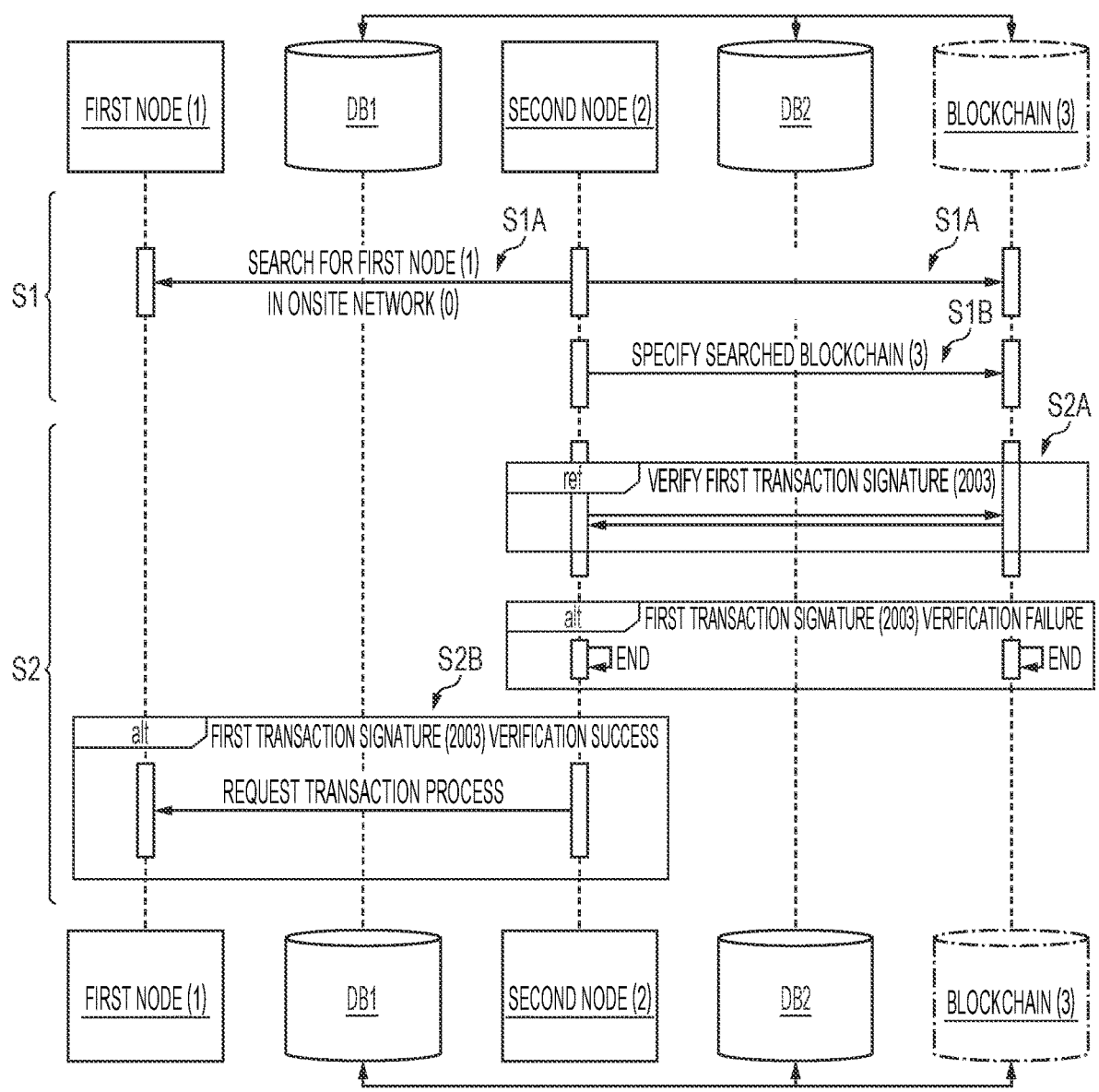
FIG. 8 is a sequence diagram of a process that includes a chain specifying step and a transaction requesting step according to an embodiment of the present invention.

As illustrated in FIG. 8, in the chain specifying step S1, first, the second node 2 searches for any first nodes 1 and any blockchains 3 on the onsite network 0 (chain specifying step S1A). Next, at least one of the found blockchain 3 is specified via a screen display or the like (chain specifying step S1B).

In the chain specifying step S1 in Embodiment 1, the user-defined profile related to the first node 1 and/or the blockchain 3 may be used as a search condition. As an example, the user-defined profile includes the separation distance between the first node 1 and the second node 2, the terminal data 1003 corresponding to the first node 1, or information included in the user-defined schema 3001 in the blockchain 3.

Specifically, a condition such as whether or not the user-defined profile contains credit line data can be treated as a search condition. Also, specifically, a condition such as whether or not a set amount of money included in the credit line data is a predetermined value or greater may also be treated as a search condition. Also, specifically, a condition such as whether or not term-of-validity data included in settlement data exceeds the current date and time may also be treated as a search condition.

The separation distance in Embodiment 1 may be estimated on the basis of a communication range evaluation by short-range wireless communication between the first node 1 and the second node 2 for which a interconnection is maintained. Additionally, the separation distance may be estimated by indoor or outdoor positioning based on one or more beacon terminals installed around the second node 2. Positioning for estimating the separation distance may be configured to be performed not only with radio waves, but also with sound waves or visible light. Additionally, the separation distance may also be configured to be estimated on the basis of image processing that includes object tracking.

<Transaction Requesting Step S2>

As illustrated in FIG. 8, in the transaction requesting step S2, first, the first transaction signature 1007 in the blockchain 3 is verified on the basis of the first public key 1001 (transaction requesting step S2A). In the case where the verification of the first transaction signature 1007 fails, the process according to the transaction requesting step S2 ends. In the case where the verification of the first transaction signature 1007 is successful, a transaction request is transmitted to the first node 1 (transaction requesting step S2B).

In the case of that the transaction request is a request for a settlement process for example, the transaction request in Embodiment 1 may be configured to include transmitting account information corresponding to a seller user who possesses the second node 2. The account information may also be pre-stored in the second database DB2.

<Authenticating Step S3>

Figure 9:
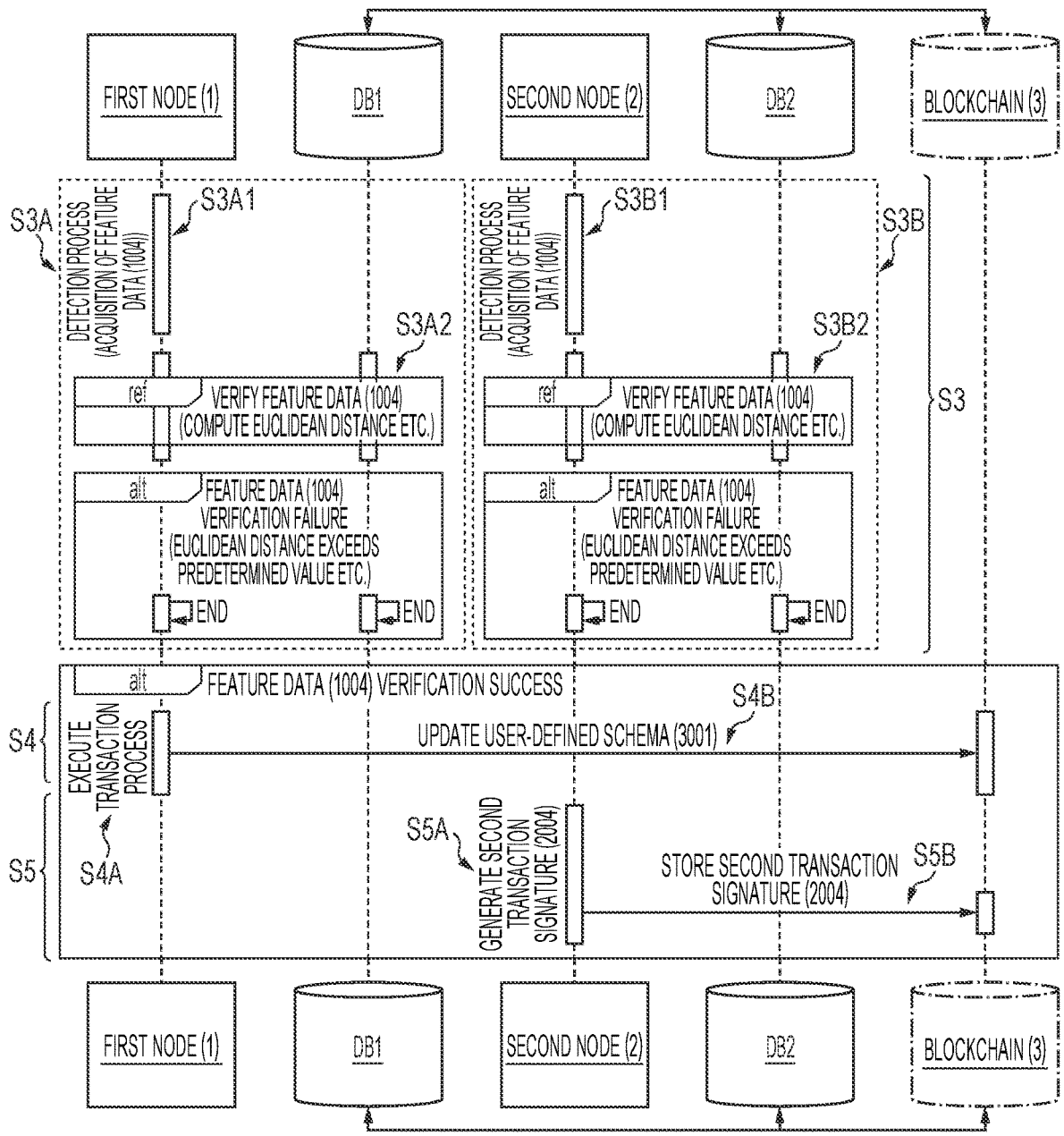
FIG. 9 is a sequence diagram of a process that includes an authenticating step, a transaction executing step, and a second signing step according to an embodiment of the present invention.

As illustrated in FIG. 9, the authenticating step S3 in Embodiment 1 is based on the first authenticating step S3A by the first authenticating means 105 and/or the second authenticating step S3B by the second authenticating means 204. In the authenticating step S3, first, detection data is acquired and the feature data 1004 is determined. In the authenticating step S3, verification is performed on the basis of the above feature data 1004 and feature data 1004 pre-stored in the first node 1 or the second node 2 (first authenticating step S3A1 or second authenticating step S3B1). In the case where the verification of the feature data 1004 fails, the process according to the authenticating step S3 ends.

<Transaction Executing Step S4>

As illustrated in FIG. 9, the transaction executing step S4 in Embodiment 1 is performed in the case where the verification of the feature data 1004 is successful in the authenticating step S3. In the transaction executing step S4, first, the transaction process is executed (transaction executing step S4A).

For example, the transaction process in Embodiment 1 is a settlement process or the like based on the user-defined profile and the user-defined script included in the user-defined schema 3001. At this time, the transaction process may be configured to be performed on the basis of a transaction token in the blockchain 3. Next, the result of the settlement process is made to be reflected in the user-defined schema 3001 (transaction executing step S4B).

<Second Signing Step S5>

As illustrated in FIG. 9, similarly to the transaction executing step S4, the second signing step S5 in Embodiment 1 is performed in the case where the verification of the feature data 1004 is successful in the authenticating step S3. In the second signing step S5, first, the second transaction signature 2004 is generated (second signing step S5A). Next, the second transaction signature 2004 is stored in the unfinalized block 33 in the blockchain 3 (second signing step S5B).

<Chain Updating Step S6>

Figure 10:
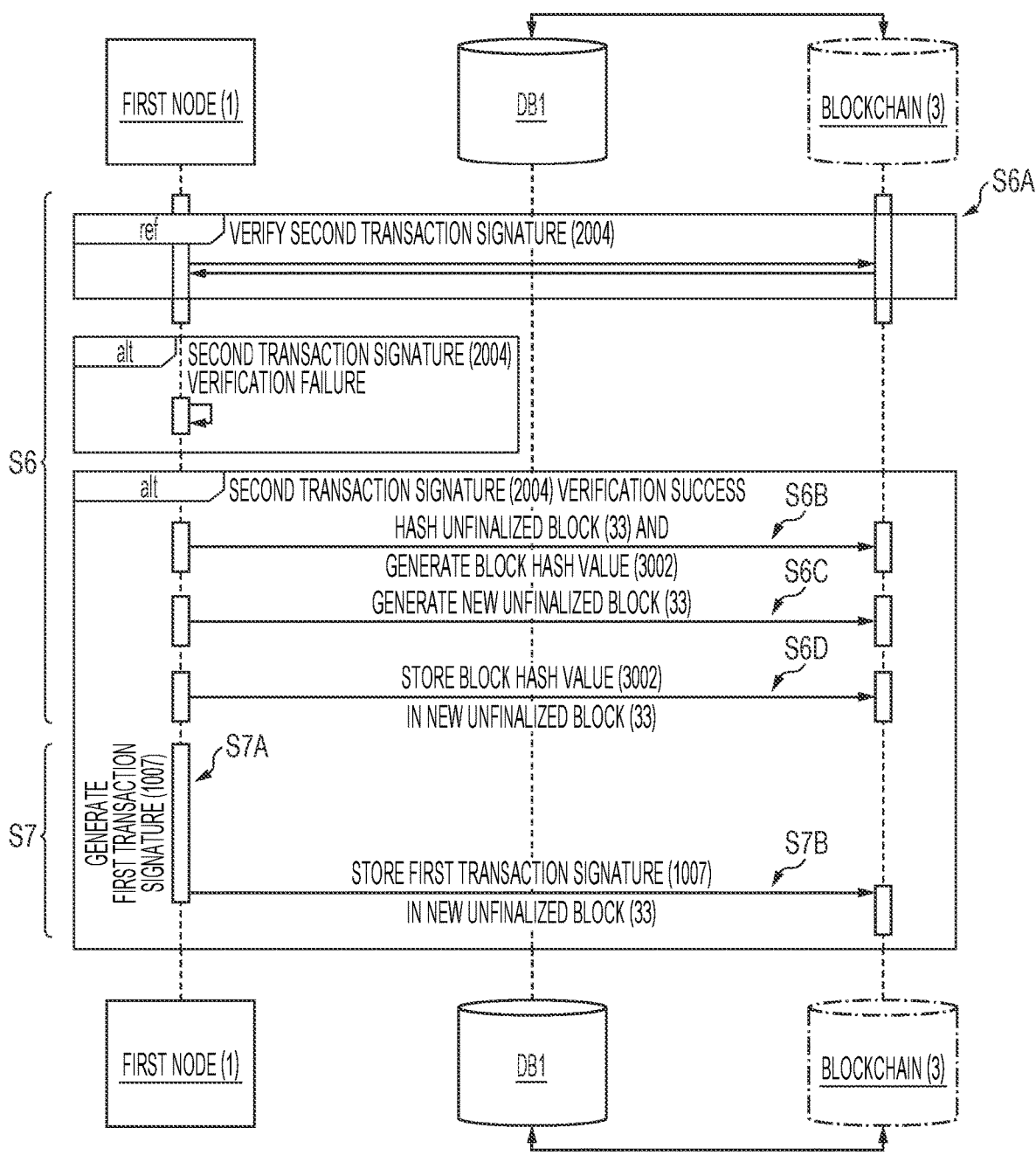
FIG. 10 is a sequence diagram of a process illustrating a chain updating step that includes a first signing step according to an embodiment of the present invention.
Figure 11:
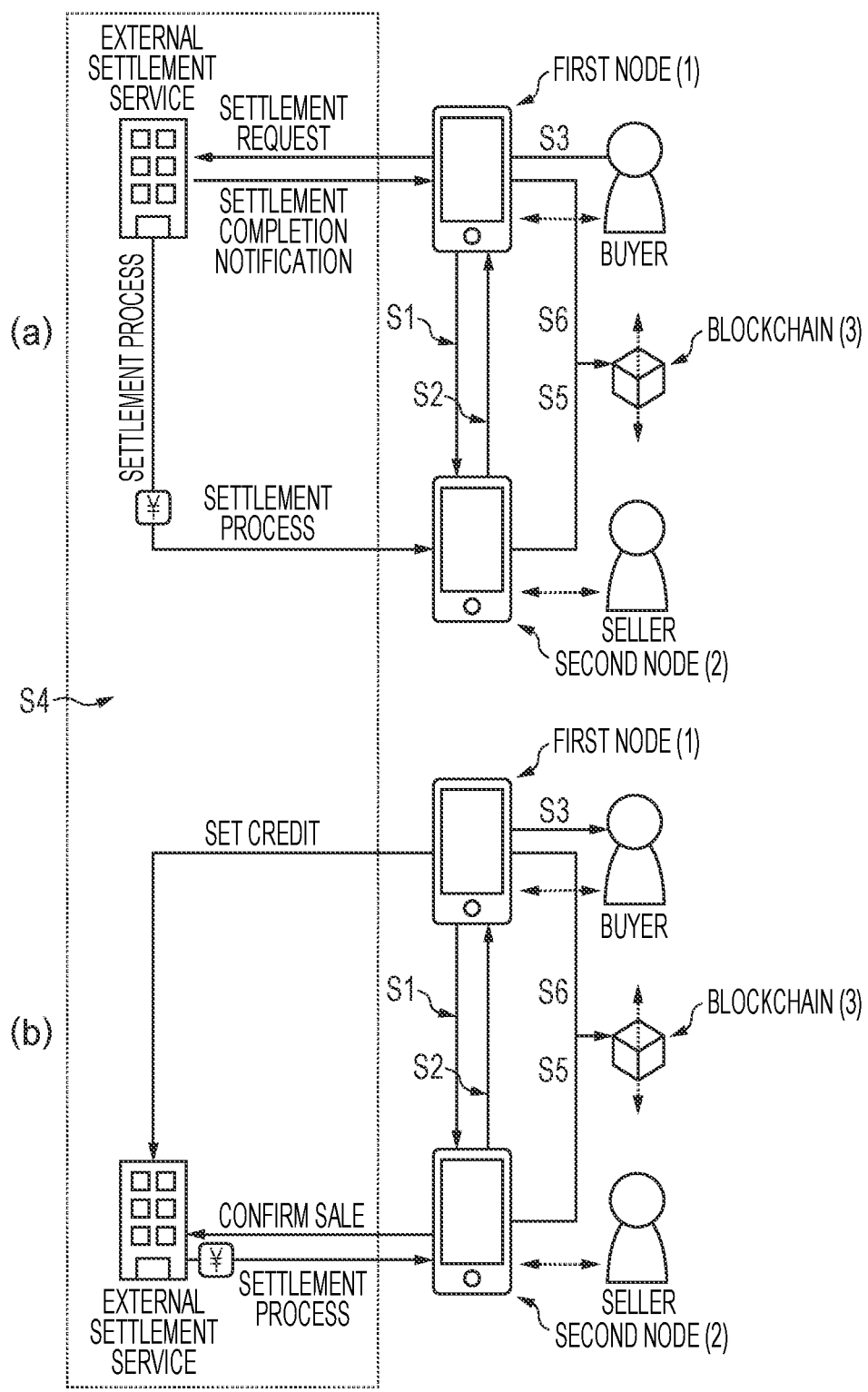
FIG. 11 is a schematic diagram of an Example corresponding to an embodiment of the present invention, and illustrating a case where settlement is performed in the transaction executing step.

As illustrated in FIG. 10, in the chain updating step S6 in Embodiment 1, first, the second transaction signature 2004 in the unfinalized block 33 is verified (chain updating step S6A). In the case where the verification of the second transaction signature 2004 fails, the process according to the chain updating step S6 ends. In the case where the verification of the second transaction signature 2004 is successful, the unfinalized block 33 is hashed and the block hash value 3003 is acquired (chain updating step S6B). Next, a new unfinalized block 33 is generated (chain updating step S6C). Next, the block hash value 3003 is stored in the new unfinalized block (chain updating step S6D).

<First Signing Step S7>

As illustrated in FIG. 10, in the first signing step S7 in Embodiment 1, first, the first transaction signature 1007 is generated (first signing step S7A). Next, the first transaction signature 1007 stored in the unfinalized block 33 newly generated in the chain updating step S6 (first signing step S7B). The first signing step S7 in Embodiment 1 is preferably configured to be performed after the chain updating step S6.

Hereinafter, an example that includes a settlement process based on the onsite network 0 of Embodiment 1 will be described.

As illustrated in FIG. 11(a), in the example according to Embodiment 1, an immediate settlement process is performed in the transaction executing step S4. At this time, assume that a micropayment is performed when triggered by the exchange of a service or the like between a buyer user who possesses the first node 1 and a seller user who possesses the second node 2. In the transaction executing step S4, first, the first node 1 issues a settlement request to an external settlement service. Next, the external settlement service performs a settlement process on the basis of information such as account information corresponding to the second node 2.

As illustrated in FIG. 11(b), in the example according to Embodiment 1, in the transaction executing step S4, a deposit settlement process based on credit line data in the user-defined schema 3001 is performed. In the transaction executing step S4, credit is set with respect to the external settlement service, and the user-defined schema 3001 is updated. In a similar manner to the example illustrated in FIG. 11(a), a settlement process is performed on the basis of information such as account information corresponding to the seller user who has the second node 2. The external settlement service is a service provided by a surety company, for example.

Note that the functions related to the external settlement service in one embodiment of the present invention may also be configured to be managed by the seller user. Specifically, it may be configured such that the management of the credit line data or credit card data, including the acceptance of a credit setting, is performed by the seller user.

In the description of this specification, the "settlement process" is a comprehensive settlement process including a settlement request to the external settlement service. Also, the example illustrated in FIG. 11(a) is a settlement process based on credit card data, and the user-defined schema 3001 is also suitably decided as appropriate.

<Screen Display Examples>

Hereinafter, screen display examples in the information management system of Embodiment 1 will be described using FIGS. 12 and 13.

Figure 12:
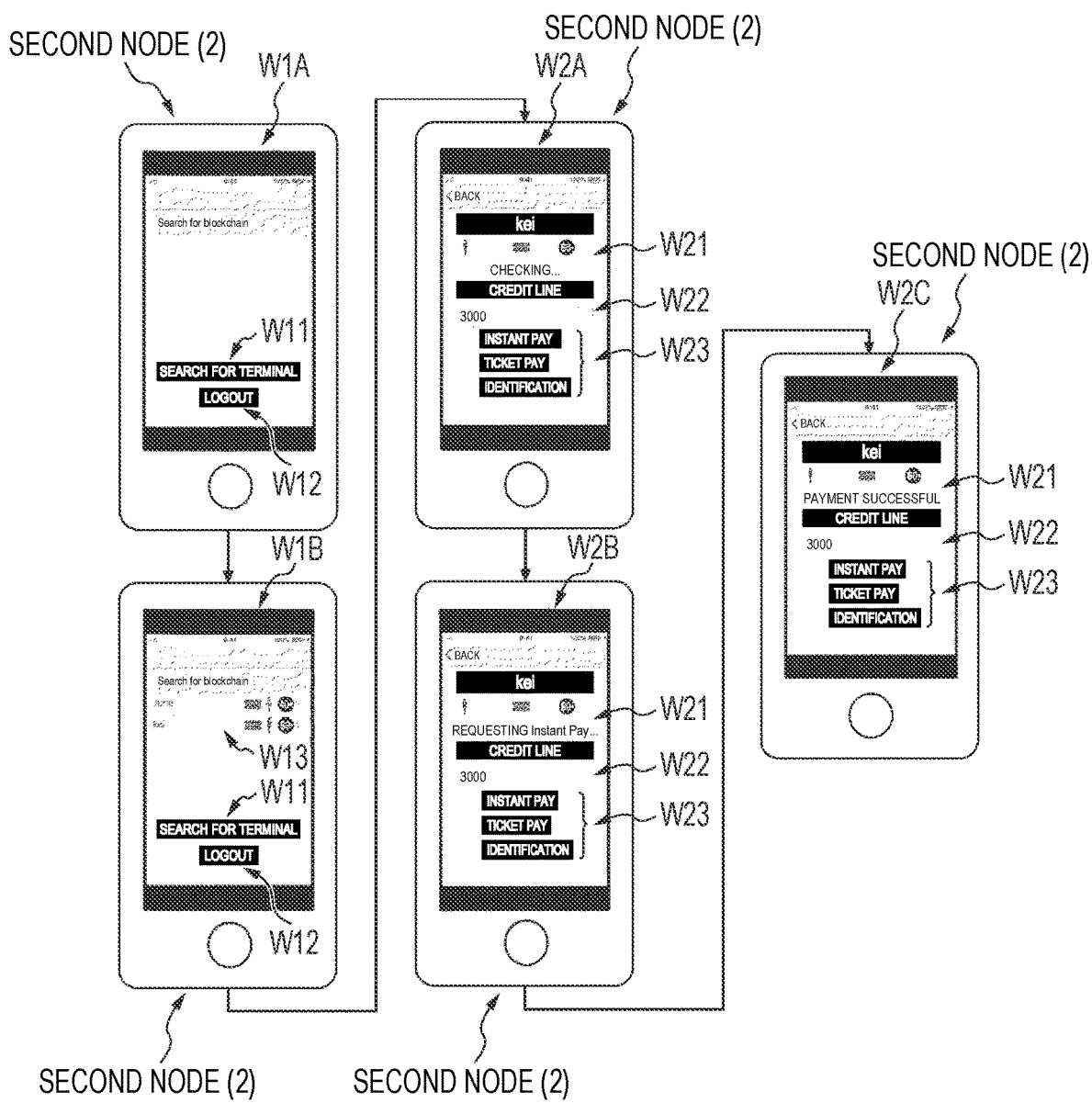
FIG. 12 illustrates screen display examples corresponding to a process that includes the chain specifying step and the transaction requesting step according to an embodiment of the present invention.

As illustrated in FIG. 12, in the chain specifying step S1, a chain specification screen W1 is displayed on the second node 2. On a chain specification screen W1A, a chain search intention input section W11 and a chain search cancel intention input section W12 are displayed. On a chain specification screen W1B, in the case where the chain search intention input section W11 is specified, a chain search result display section W13 is further displayed.

In the chain search result display section W13, each blockchain 3 is displayed on the basis of the user-defined schema 3001 corresponding to each blockchain 3 and/or the attribute data 1005 of the first node 1 corresponding to each blockchain 3. Specifically, for example, a display object is decided on the basis of personal information such as the username, gender, and age included in the attribute data 1005. Also, for example, a display object is decided appropriately on the basis of the user-defined schema 3001.

As illustrated in FIG. 12, in the transaction requesting step S2, a transaction request screen W2 is displayed on the second node 2. On a transaction request screen W2A, in the case where at least one of the blockchains 3 in the chain search result display section W13 is specified, a chain information display section W21, a transaction request information input section W22, and a transaction request intention input section W23 are displayed. In the chain information display section W21, at least a portion of the display content in the chain search result display section W13 and a transaction request status are displayed.

In the transaction request information input section W22, in the case where a settlement process is performed in the transaction executing step S4 for example, an input section for information related to the settlement amount is displayed. In the transaction request intention input section W23, one or more input sections corresponding to the type of transaction process performed in the transaction executing step S4 are displayed. As an example, the transaction request intention input section W23 in FIG. 12 corresponds to each of an immediate settlement process, a deposit settlement process, and a qualification authentication process described later.

On a transaction request screen W2B, a transaction request status for the case where the transaction request intention input section W23 is specified is displayed. On a transaction request screen W2C, a transaction request status for the case where the transaction process is completed by the first node 1 is displayed.

In a profile display section W31, display content that indicates the transaction process on the basis of the user-defined schema 3001 in the blockchain 3 is displayed.

In a network status display section W32, for example, the distance between the first node 1 and the second node 2 is displayed as information related to the onsite network 0. In a profile setting intention input section W33, an intention input section for making changes related to the user-defined schema 3001 is displayed.

The separation distance display process in Embodiment 1 is not limited to a process of displaying the separation distance as numerical data, and may be a display process that indicates whether or not the distance exceeds a predetermined threshold value. In this case, it may be configured such that a plurality of such threshold values are set, and a display object is decided appropriately according to each of the plurality of threshold values.

In the case where the user-defined schema 3001 is changed in response to an intention input through the profile setting intention input section W33, a configuration in which the first signing means 103 generates and adds the first transaction signature 1007 to the unfinalized block 33 again is preferable. In this case, the verification of the first transaction signature 1007 by the second node 2 obviously is performed again.

Figure 13:
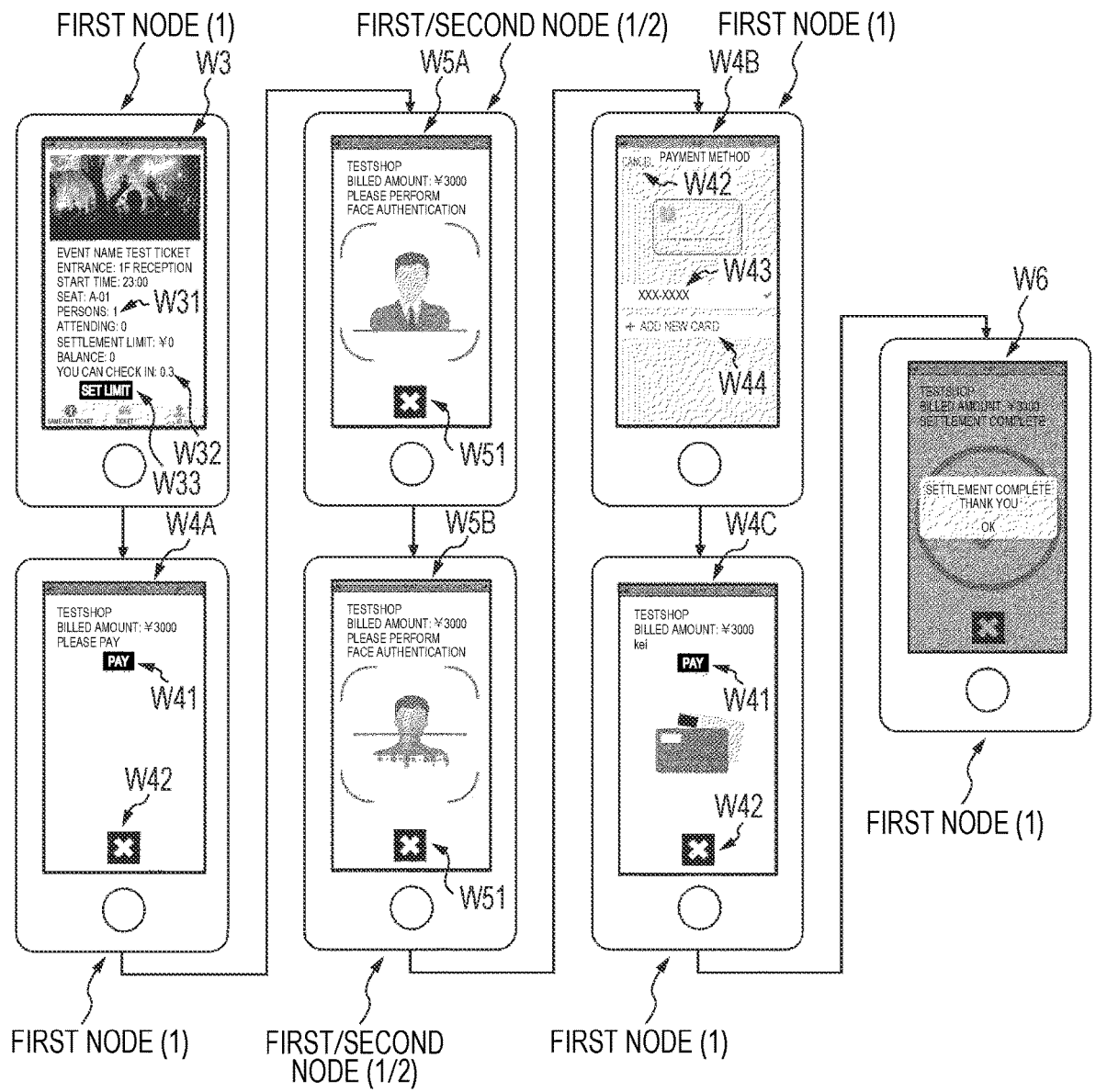
FIG. 13 illustrates screen display examples corresponding to a process that includes the transaction executing step and the authenticating step according to an embodiment of the present invention.

As illustrated in FIG. 13, in the case where a blockchain 3 is specified and a transaction request is transmitted by the second node 2, a transaction start screen W4A is displayed on the first node 1. On the transaction start screen W4A, a transaction start intention input section W41 and a transaction cancel intention input section W42 are displayed. The transaction start input section is displayed as an intention input related to a settlement process, for example.

As illustrated in FIG. 13, in the case where the transaction start intention input section W41 is specified, the first node 1 or the second node 2 temporarily displays the authentication screen W5. During this process, the authenticating step S3 is performed.

On an authentication screen W5A and an authentication screen W5B, information related to the transaction process as well as an authentication status and an authentication cancel intention input section W51 are displayed. In the case where the authentication cancel intention input section W51 is specified, the first node 1 or the second node 2 transitions to the transaction start screen W4A.

As illustrated in FIG. 13, in the case of that the verification of the feature data 1004 is successful during the authenticating step S3, a transaction start screen W4B is displayed. On the transaction start screen W4B, a card decision intention input section W43 and a card change intention input section W44 related to credit card information are displayed. Note that in the case of that a card change process is performed when triggered by the specification of the card change intention input section W44, the transaction start screen W4B is displayed again. In the case where the card decision intention input section W43 is specified, the screen display by the first node 1 transitions to a transaction start screen W4C. In the case where the transaction start intention input section W41 on the transaction start screen W4C is specified, a transaction completion screen W6 is finally displayed.

Embodiment 2

Hereinafter, Embodiment 2 of the information management system will be described.

Note that unless specifically indicated otherwise, the hardware configuration, the functions, and their corresponding signs in Embodiment 2 are similar to those in Embodiment 1.

Figure 14:
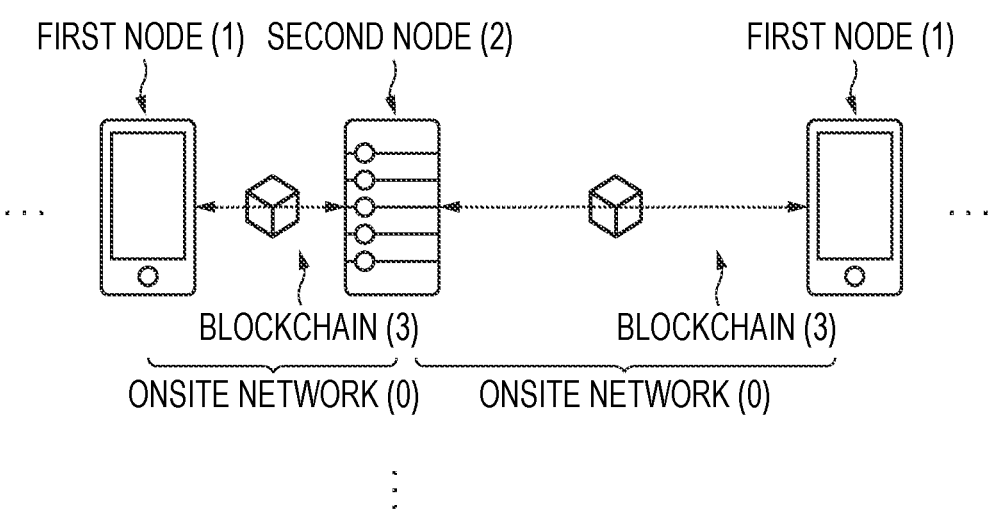
FIG. 14 is an overview of an onsite network according to an embodiment of the present invention.

As illustrated in FIG. 14, the onsite network 0 in Embodiment 2 is not limited to short-range wireless communication, and the first node 1 and the second node 2 are interconnected via a typical communication network. As an example, on the onsite network 0 in Embodiment 2, web login authentication is achieved between the first node 1 and the second node 2.

In Embodiment 2, in the web login authentication, in the transaction executing step S4, the first node 1 generates a login signature based on information such as identification information and a password for login, and transmits the login signature to the second node 2. Next, the second node 2 verifies the login signature. At this time, in the case that of the verification is successful, the second node 2 permits the login by the first node 1.

According to Embodiment 2 of the present invention, two-factor authentication involving authentication by identification information and a password for login pre-written into the user-defined schema 3001 and authentication of the feature data 1004 in the authenticating step S3 can be achieved. Note that the information such as the identification information and password for login may be written in the user-defined schema 3001 or stored in the blockchain 3 as a transaction token.

Embodiment 3

Hereinafter, Embodiment 3 of the information management system will be described.

Note that unless specifically indicated otherwise, the hardware configuration, the functions, and their corresponding signs in Embodiment 3 are similar to those in Embodiment 1.

Figure 15:
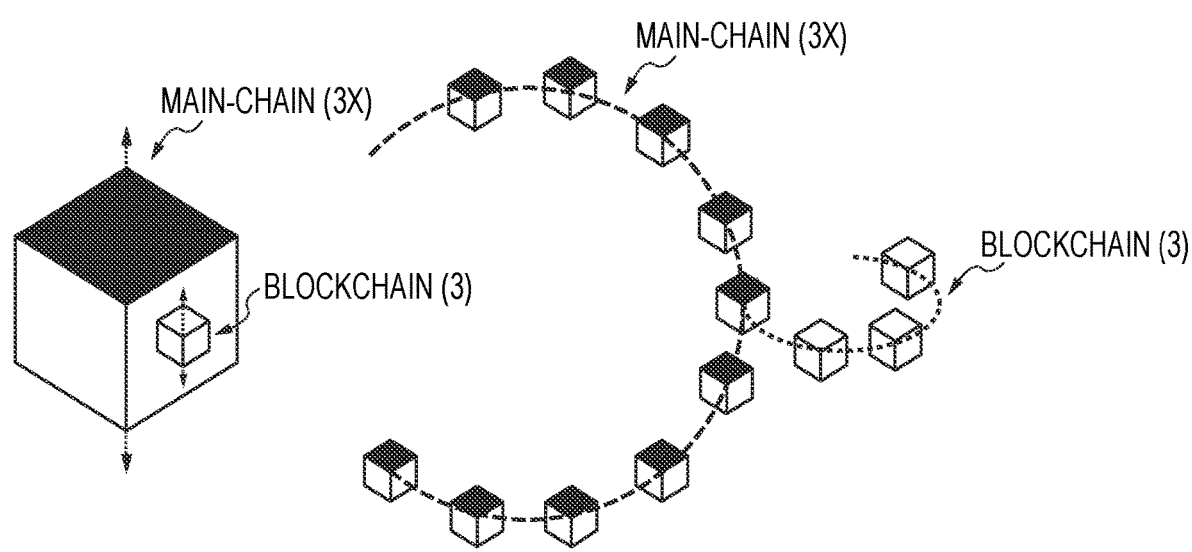
FIG. 15 is an overview of a blockchain according to an embodiment of the present invention.

As illustrated in FIG. 15, the blockchain 3 in Embodiment 3 is configured as a sidechain stored in a block in a main-chain 3X. In this case, the block in the main-chain 3X includes the feature data 1004.

Like a blockchain, the main-chain 3X includes an initial block, a finalized block, and an unfinalized block. The finalization of a block associated with the main-chain 3X is performed by consensus formation with at least one second node 2. After that, an unfinalized block is newly generated by the second node 2.

The main-chain 3X may perform block finalization/block generation when triggered by the generation/addition of a signature by the first node 1 and/or the second node 2. In this case, the hash value or the like used in signature generation is not particularly limited.

Transaction data is stored in each block in the main-chain 3X. As an example, the transaction data is used for managing ownership privileges of electronic tickets or the like. The main-chain 3X in Embodiment 3 can be understood as an Example of managing entry tickets to an arbitrary venue. Also, the main-chain 3X in Embodiment 3 can be understood as an example of managing tickets associated with any monetary value.

As an example, the generation of the initial block (genesis block) in the blockchain 3 in Embodiment 3 can be understood as being executed at the time of completing entry into an arbitrary venue. Additionally, finalization related to an unfinalized block in the main-chain storing the blockchain 3 can be understood as being performed at the time of exiting the arbitrary venue. At this time, the entry and exit with respect to the arbitrary venue are managed as transaction data in the main-chain 3X.

The main-chain 3X may include the user-defined schema 3001 in the blockchain 3. It may also be configured such that the feature data 1004 and the user-defined schema 3001 in the main-chain 3X are stored in the blockchain 3 when triggered by entry into the arbitrary venue or the like. The main-chain 3X may store various information in the first database and be used for block finalization, block generation, and signature generation/addition.

According to Embodiment 3 of the present invention, management of transaction can be achieved as a multi-chain based on the main-chain 3X and the blockchain 3, and unauthorized transactions by a malicious user can be preemptively avoided.

According to the present invention, a simple information management solution that is also capable of achieving excellent privacy protection can be provided.

REFERENCE SIGNS LIST

0 Onsite network
1, 1A, 1B First node
2, 2A, 2B, 2C Second node
3, 3A, 3B Blockchain
11 First arithmetic device
12 First primary storage device
13 First auxiliary storage device
14 First input device
15 First output device
16 First communication device
17 First detection device
21 Second arithmetic device
22 Second primary storage device
23 Second auxiliary storage device
24 Second input device
25 Second output device 26 Second communication device
27 Second detection device
30 Block group
31 Initial block
32 Finalized block
33 Undecided block
3X Main-chain
101 First inputting means
102 First outputting means
103 First signing means
104 Registering means
105 First authenticating means
106 Chain updating means
107 Transaction executing means
201 Second inputting means
202 Second outputting means
203 Second signing means
204 Second authenticating means
205 Registration accepting means
206 Transaction requesting means
207 Chain specifying means
1001 First public key
1002 First private key
1003 Terminal data
1004 Feature data
1005 Attribute data
1006 Terminal signature
1007 First transaction signature
2001 Second public key
2002 Second private key
2003 Feature signature
2004 Second transaction signature
3001 User-defined schema
3002 Timestamp
3003 Block hash value
DB1 First database
DB2 Second database
NW Communication network
S0, S0A, S0B, S0C, S0D Registering step
S1, S1A, S1B Chain specifying step
S2, S2A, S2B Transaction requesting step
S3 Authenticating step
S3A, S3A1 First authenticating step
S3B, S3B1 Second authenticating step
S4, S4A, S4B Transaction executing step
S5, S5A Second signing step
S6, S6A, S6B, S6C, S6D Chain updating step
S7, S7A, S7B First signing step
D1, D2 Communicable distance
W1, W1A, W1B Chain specification screen
W2, W2A, W2B, W2C Transaction request screen
W3 Standby screen
W4, W4A, W4B, W4C Transaction start screen
W5, W5A, W5B Authentication screen
W6 Transaction completion screen
W11 Chain search intention input section
W12 Chain search cancel intention input section
W13 Chain search result display section
W21 Chain information display section
W22 Transaction request information input section
W23 Transaction request intention input section
W31 Profile display section
W32 Network status display section
W33 Profile setting intention input section
W41 Transaction start intention input section
W42 Transaction cancel intention input section
W43 Card decision intention input section
W44 Card change intention input section
W51 Authentication cancel intention input section

The invention claimed is:

1. An information management system comprising:
a first node that includes a first processor and a first memory;
the first memory of the first node stores a private key and a unique blockchain that is unique thereto;
wherein the unique blockchain includes on an unfinalized block a user-defined schema that includes a user-defined script for a smart contract execution and a user-defined profile that includes a result of the smart contract execution, and a first transaction signature generated based on the user-defined schema;
a plurality of second nodes, each second node includes a second processor and a second memory, each second node is configured to form an on-site network with the first node so that each second node is in unicast communication with the first node; and
the second memory of one second node of the second nodes stores the unique blockchain;
the first node and the one second node execute the following processes on the on-site network:
the second processor of the one second node is configured to verify the first transaction signature and if verification of the first transaction signature is successful, to send a transaction request to the first node,
the first processor of the first node or the second processor of the one second node is configured to execute an authentication process on a basis of feature data,
the first processor of the first node is configured to execute a transaction process based on the user-defined profile and the user-defined script included in the user-defined schema and to change the user-defined schema based on the result of the transaction process,
the second processor of the one second node is configured to generate a second transaction signature and to add the second transaction signature to the unfinalized block in the unique blockchain associated with the first node on a basis of a result of the authentication process, and
the first processor of the first node is configured to hash the unfinalized block and generate a new unfinalized block to generate a new first transaction signature based on the private key and the user-defined schema and to add the new first transaction signature to the new unfinalized block in the unique blockchain associated with the first node; and
the first processor of the first node is configured to change the user-defined script and to generate another new first transaction signature, the second processor of the one second node is configured to verify the another new first transaction signature and to add the another new first transaction signature to the new unfinalized block.

2. The information management system according to claim 1, wherein
the user-defined schema corresponds to an owner or administrator of the first node, and
the first processor of the first node is configured to generate the another new first transaction signature using a hash value of the user-defined script.

3. The information management system according to claim 1, wherein
the unique blockchain of the first node is a private chain unique to the first node.

4. The information management system according to claim 1, wherein
the unfinalized block contains a hash value of a preceding finalized block, and
the first processor of the first node is configured to generate a finalized block that contains the user-defined script, the first transaction signature corresponding to the user-defined script, the second transaction signature added after successful verification of the first transaction signature and a hash value of an immediately preceding finalized block.

5. The information management system according to claim 1, wherein
the first processor of the first node or the second processor of the one second node is configured to execute the authentication process on a basis of the feature data that is newly acquired by the first node during the authentication process.

6. The information management system according to claim 1, wherein
the first processor of the first node or the second processor of the one second node is configured to execute the authentication process on a basis of the feature data that is newly acquired by the one second node during the authentication process.

7. The information management system according to claim 1, wherein
the feature data is based on biometric data, and the biometric data is face data.

8. The information management system according to claim 1, wherein
the first processor of the first node is configured to generate and add the first transaction signature when triggered by the hashing and the new unfinalized block generation by the first processor of the first node.

9. The information management system according to claim 1, wherein
the first processor of the first node is further configured to transmit a terminal signature corresponding to the first node and the feature data to the one second node,
the second processor of the one second node is configured to receive the feature data on a basis of the terminal signature and to transmit a feature signature based on the feature data to the first node, and
the first processor of the first node or the second processor of the one second node is configured to execute the authentication process in a case where the first node has the feature signature.

10. The information management system according to claim 1, wherein
the first processor of the first node or the second processor of the one second node is configured to execute the authentication process on a basis of the feature data that is acquired by the first node or by the one second node when triggered by the request by the first processor of the first node, and
the second processor of the one second node is configured to generate and add the second transaction signature when triggered by the execution of the transaction process by the first processor of the first node.

11. The information management system according to claim 1, wherein
the one second node is in communication with the first node via short-range wireless communication.

12. The information management system according to claim 1, wherein
the unique blockchain is a sidechain stored in a block in a main-chain, and
a genesis block of the unique blockchain is generated when triggered by storing a specific transaction in the main-chain.

13. The information management system according to claim 12, wherein
the block in the main-chain contains the feature data.

14. An information management method executed by first node that includes a first processor and a first memory;
the first memory of the first node stores a private key and a unique blockchain that is unique thereto;
wherein the unique blockchain includes on an unfinalized block a user-defined schema that includes a user-defined script for a smart contract execution and a user-defined profile that includes a result of the smart contract execution, and a first transaction signature generated based on the user-defined schema; and
a plurality of second nodes, each second node includes a second processor and a second memory, each second node is configured to form an on-site network with the first node so that each second node is in unicast communication with the first node; and
the second memory of one second node of the second nodes stores the unique blockchain, wherein the information management method comprises:
the first node and the one second node execute the following processes on the on-site network:
verifying, by the second processor of the one second node, the first transaction signature and if verification of the first transaction signature is successful, sending a transaction request to the first node;
executing, by the first processor of the first node or the second processor of the one second node, an authentication process on a basis of feature data;
executing, by the first processor of the first node, a transaction process based on the user-defined profile and the user-defined script included in the user-defined schema and changing, by the first processor of the first node, the user-defined schema based on the result of the transaction process;
generating, by the second processor of the one second node, a second transaction signature and adding, by the second processor of the one second node, the second transaction signature to the unfinalized block in the unique blockchain associated with the first node on a basis of a result of the authentication process; and
hashing, by the first processor of the first node, the unfinalized block;
generating, by the first processor of the first node, a new unfinalized block in the unique blockchain;
generating, by the first processor of the first node, a new first transaction signature based on the private key and the user-defined script;
adding, by the first processor of the first node, the new first transaction signature to the new unfinalized block in the unique blockchain associated with the first node;
changing, by the first processor of the first node, the user-defined script;
generating, by the first processor of the first node, another new first transaction signature;
verifying, by the second processor of the one second node, the another new first transaction signature; and
adding, by the first processor of the first node, the another new first transaction signature to the new unfinalized block.

* * * * *